(12) United States Patent
Suzuki et al.

(10) Patent No.: US 10,090,990 B2
(45) Date of Patent: Oct. 2, 2018

(54) USER EQUIPMENT, BASE STATION APPARATUS, INTEGRATED CIRCUIT, AND COMMUNICATION METHOD

(71) Applicant: Sharp Kabushiki Kaisha, Sakai-shi, Osaka (JP)

(72) Inventors: Shoichi Suzuki, Sakai (JP); Tatsushi Aiba, Sakai (JP); Kazunari Yokomakura, Sakai (JP); Kimihiko Imamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 22 days.

(21) Appl. No.: 15/112,435

(22) PCT Filed: Dec. 15, 2014

(86) PCT No.: PCT/JP2014/083138
§ 371 (c)(1),
(2) Date: Jul. 19, 2016

(87) PCT Pub. No.: WO2015/111325
PCT Pub. Date: Jul. 30, 2015

(65) Prior Publication Data
US 2016/0337112 A1    Nov. 17, 2016

(30) Foreign Application Priority Data
Jan. 22, 2014  (JP) ................................. 2014-009065

(51) Int. Cl.
*H04L 5/14*     (2006.01)
*H04L 5/00*     (2006.01)

(52) U.S. Cl.
CPC ............ *H04L 5/1469* (2013.01); *H04L 5/001* (2013.01); *H04L 5/0053* (2013.01); *H04L 5/0073* (2013.01)

(58) Field of Classification Search
CPC ..... H04L 5/1469; H04L 5/001; H04L 5/0053; H04L 5/0073
(Continued)

(56) References Cited

U.S. PATENT DOCUMENTS

| 2014/0010213 | A1* | 1/2014 | Wang | H04B 7/0632 |
|---|---|---|---|---|
| | | | | 370/336 |
| 2014/0334355 | A1* | 11/2014 | Ekpenyong | H04B 1/56 |
| | | | | 370/280 |

(Continued)

OTHER PUBLICATIONS

Intel Corporation, "On remaining details of signaling design and HARQ feedback for eIMTA", 3GPP TSG-RAN WG1 #75, R1-135101, Nov. 11-15, 2013, pp. 1-6.
Sharp, "Remaining issues for explicit L1 reconfiguration signaling", 3GPP TSG RAN WG1 Meeting #75, R1-135727, Nov. 11-15, 2013, pp. 1-6.
(Continued)

*Primary Examiner* — Obaidul Huq
(74) *Attorney, Agent, or Firm* — Keating & Bennett, LLP

(57) ABSTRACT

In a user equipment, in a case where an index for an uplink-downlink configuration is configured for any of activated serving cells included in the plurality of cells, configured to monitor a physical downlink control channel (PDCCH) indicating a plurality of uplink-downlink configuration in a common search space for a primary cell, in a periodicity T, in a case where the PDCCH is detected in a radio frame, the uplink-downlink configuration for T/10 radio frames in a serving cell is given by the index.

8 Claims, 18 Drawing Sheets

(58) Field of Classification Search
USPC .......................................... 370/276, 277, 280
See application file for complete search history.

(56) References Cited

U.S. PATENT DOCUMENTS

| | | | | |
|---|---|---|---|---|
| 2015/0003301 A1* | 1/2015 | He | ..................... | H04B 7/0452 370/280 |
| 2015/0029910 A1* | 1/2015 | He | ..................... | H04W 76/02 370/280 |
| 2015/0043396 A1* | 2/2015 | Ekpenyong | ........... | H04L 5/1469 370/280 |

OTHER PUBLICATIONS

Qualcomm Incorporated, "Discussion on signaling details for TDD UL-DL reconfiguration", 3GPP TSG RAN WG1 Meeting #75, R1-135290, Nov. 11-15, 2013, pp. 1-4.

Ericsson et al., "On standardization impact of TDD UL-DL adaptation", 3GPP TSG-RAN WG1 Meeting #69, R1-122016, May 21-25, 2012, pp. 1-3.

Ericsson et al., "Signalling support for dynamic TDD", 3GPP TSG-RAN WG1 Meeting #72, R1-130558, Jan. 28-Feb. 1, 2013, 3 pages.

Suzuki, S. "User Equipment, Base Station Apparatus, Integrated Circuit, and Communication Method"; U.S. Appl. No. 15/111,532, filed Jul. 14, 2016.

* cited by examiner

FIG. 7

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (UL-DL CONFIGURATION FOR PRIMARY CELL, UL-DL CONFIGURATION FOR SECONDARY CELL) | SECOND UL REFERENCE UL-DL CONFIGURATION FOR SECONDARY CELL |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (UL-DL CONFIGURATION FOR PRIMARY CELL, UL-DL CONFIGURATION FOR SECONDARY CELL) | SECOND DOWNLINK REFERENCE UL-DL CONFIGURATION FOR SECONDARY CELL |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 14

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

| TERMINAL DEVICE | TDD-RNTI (16 bit) | ServCellIndex | tddconfig-index |
|---|---|---|---|
| 1A | 1000000000000000 | 0 | 3 |
| | | 1 | 4 |
| 1B | 1000000000000000 | 1 | 2 |
| | | 2 | 4 |

FIG. 18

| Configuration Index *I* | Periodicity *T* (ms) | Offset k (ms) (0 ≤ k < *T*) |
|---|---|---|
| 0 | 10 | {0} |
| 1 | 10 | {1} |
| 2 | 10 | {5} |
| 3 | 10 | {6} |
| 4 | 10 | {0, 1} |
| 5 | 10 | {5, 6} |
| 6 | 10 | {0, 1, 5, 6} |
| 7 | 20 | {0} |
| 8 | 20 | {5} |
| 9 | 20 | {6} |
| 10 | 20 | {5, 6} |
| 11 | 20 | {10} |
| 12 | 20 | {11} |
| 13 | 20 | {15} |
| 14 | 20 | {16} |
| 15 | 20 | {10, 11} |
| 16 | 20 | {15, 16} |
| 17 | 20 | {0, 1, 5, 6, 10, 11, 15, 16} |
| 18 | 40 | {0} |
| 19 | 40 | {25} |
| 20 | 40 | {26} |
| 21 | 40 | {25, 26} |
| 22 | 40 | {30} |
| 23 | 40 | {31} |
| 24 | 40 | {35} |
| 25 | 40 | {36} |
| 26 | 40 | {30, 31} |
| 27 | 40 | {35, 36} |
| 28 | 40 | {0, 1, 5, 6, 10, 11, 15, 16, 20, 21, 25, 26, 30, 31, 35, 36} |
| 29 | 80 | {0} |
| 30 | 80 | {65} |
| 31 | 80 | {66} |
| 32 | 80 | {65, 66} |
| 33 | 80 | {70} |
| 34 | 80 | {71} |
| 35 | 80 | {75} |
| 36 | 80 | {76} |
| 37 | 80 | {70, 71} |
| 38 | 80 | {75, 76} |
| 39 | 80 | {0, 1, 5, 6, 10, 11, 15, 16, 20, 21, 25, 26, 30, 31, 35, 36, 40, 41, 45, 46, 50, 51, 55, 56, 60, 61, 65, 66, 70, 71, 75, 76} |

USER EQUIPMENT, BASE STATION APPARATUS, INTEGRATED CIRCUIT, AND COMMUNICATION METHOD

TECHNICAL FIELD

The present invention relates to user equipment, a base station apparatus, an integrated circuit, and a communication method.

The present application claims priority based on Japanese Patent Application No. 2014-009065, filed Jan. 22, 2014, the contents of which are incorporated herein by reference.

BACKGROUND ART

A radio access scheme and a radio network (hereinafter, referred to as "Long Term Evolution: LTE" or "Evolved Universal Terrestrial Radio Access: EUTRA") of cellular mobile communication have been discussed in 3rd Generation Partnership Project (3GPP). In LTE, a base station apparatus is also referred to as an eNodeB (evolved NodeB), and a terminal device is referred to as user equipment (UE). LTE is a cellular communication system in which a plurality of areas covered by the base station device is arranged so as to have a cell shape. A single base station apparatus may manage a plurality of cells.

LTE corresponds to time division duplex (TDD). LTE employing the TDD scheme is also referred to as TD-LTE or LTE TDD. In TDD, an uplink signal and a downlink signal are subjected to time division multiplexing.

In 3GPP, it is discussed that a traffic adaptation technology and an interference reduction technology (DL-UL Interference Management and Traffic Adaptation) is applied to TD-LTE. The traffic adaptation technology is a technology in which a ratio of uplink resources and downlink resources is changed depending on traffic of an uplink and traffic of a downlink. The traffic adaptation technology is also referred to as dynamic TDD.

In NPL 1, a method of using a flexible subframe is proposed as a method of realizing traffic adaptation. A base station apparatus can receive an uplink signal or transmit a downlink signal in a flexible subframe. In NPL 1, a terminal device considers the flexible subframe as a downlink subframe, as long as the base station apparatus does not perform an instruction of transmitting the uplink signal in the flexible subframe.

NPL 1 discloses that hybrid automatic repeat request (HARQ) timing for a physical downlink shared channel (PDSCH) is determined based on an UL-DL configuration (uplink-downlink configuration) which is newly applied, and a HARQ timing for a physical uplink shared channel (PUSCH) is determined based on the first UL-DL configuration.

NPL 2 discloses that (a) UL/DL Reference Configuration is applied, and that (b) a certain subframe may be scheduled for either of an uplink or a downlink, by dynamic grant/assignment from a scheduler.

CITATION LIST

Non-Patent Document

[Non-Patent Document 1] NPL 1: "On standardization impact of TDD UL-DL adaptation". R1-122016. Ericsson, ST-Ericsson, 3GPP TSG-RAN WG1 Meeting #69. Prague. Czech Republic, 21-25 May 2012.

[Non-Patent Document 2] NPL 2: "Signalling support for dynamic TDD", R1-130558. Ericsson, ST-Ericsson, 3GPP TSG-RAN WG1 Meeting #72. St Julian's. Malta, 28 Jan.-1 Feb. 2013.

DISCLOSURE OF THE INVENTION

Problems to be Solved by the Invention

Considering the above circumstances, an object of any aspect of the present invention is to provide user equipment, a base station apparatus, an integrated circuit, and a communication method in which efficient communication can be performed.

Means for Solving the Problems (1) In order to achieve the above-described object, any aspect of the present invention includes the following means. That is, according to a first aspect of the present invention, there is provided user equipment which includes a reception unit. The reception unit receives first information indicating a radio network temporary identifier (RNTI), second information, third information, plural pieces of fourth information, and fifth information. The second information indicates periodicity T for monitoring a physical downlink control channel with the RNTI. The third information indicates a subframe in which the user equipment monitors the physical downlink control channel with the RNTI, in the periodicity T. Each of the plural pieces of fourth information indicates an uplink-downlink configuration which is transmitted in the physical downlink control channel with the RNTI. The fifth information is used for determining an index of fourth information for a serving cell among the plural pieces of fourth information. In a case where the fifth information is configured for any of activated serving cells, the reception unit monitors the physical downlink control channel with the RNTI, in a common search space for a primary cell, in the subframe for monitoring the physical downlink control channel with the RNTI. In a case where the physical downlink control channel with the RNTI is detected in a radio frame $\{m \cdot T/10, m \cdot T/10+1, \ldots, (m+1) \cdot T/10-1\}$, an uplink-downlink configuration for the radio frame $\{(m+1) \cdot T/10, (m+1) \cdot T/10+1, \ldots, (m+2) \cdot T/10-1\}$ in the serving cell is given by fourth information for the serving cell. The periodicity T is 20 milliseconds, 40 milliseconds, or 80 milliseconds.

(2) In the first aspect of the present invention, the uplink-downlink configuration for the radio frame $\{(m+1) \cdot T/10, (m+1) \cdot T/10+1, \ldots, (m+2) \cdot T/10-1\}$ may be used for monitoring the physical downlink control channel.

(3) According to a second aspect of the present invention, there is provided a communication method used in user equipment. The communication method includes receiving first information indicating a radio network temporary identifier (RNTI), second information, third information, plural pieces of fourth information, and fifth information, the second information indicating periodicity T for monitoring a physical downlink control channel with the RNTI, the third information indicating a subframe in which the user equipment monitors the physical downlink control channel with the RNTI, in the periodicity T, each of the plural pieces of fourth information indicating an uplink-downlink configuration which is transmitted in the physical downlink control channel with the RNTI, and the fifth information being used for determining an index of fourth information for a serving cell among the plural pieces of fourth information, and monitoring the physical downlink control channel with the RNTI in a common search space for a primary cell, in the subframe for monitoring the physical downlink control channel with the RNTI, in a case where the fifth information is configured for any of activated serving cells. In a case where the physical downlink control channel with the RNTI is detected in a radio frame {m·T/10, m·T/10+1, ..., (m+1)·T/10−1}, an uplink-downlink configuration for the radio frame {(m+1)·T/10, (m+1)·T/10+1, ..., (m+2)·T/10−1} in the serving cell is given by fourth information for the serving cell. The periodicity T is 20 milliseconds, 40 milliseconds, or 80 milliseconds.

(4) In the second aspect of the present invention, the uplink-downlink configuration for the radio frame {(m+1)·T/10, (m+1)·T/10+1, ..., (m+2)·T/10−1} may be used for monitoring the physical downlink control channel.

(5) According to a third aspect of the present invention, there is provided an integrated circuit which is mounted in user equipment, and executes a series of functions. The series of functions include a function of receiving first information indicating a radio network temporary identifier (RNTI), second information, third information, plural pieces of fourth information, and fifth information, the second information indicating periodicity T for monitoring a physical downlink control channel with the RNTI, the third information indicating a subframe in which the user equipment monitors the physical downlink control channel with the RNTI, in the periodicity T, each of the plural pieces of fourth information indicating an uplink-downlink configuration which is transmitted in the physical downlink control channel with the RNTI, and the fifth information being used for determining an index of fourth information for a serving cell among the plural pieces of fourth information, and a function of monitoring the physical downlink control channel with the RNTI in a common search space for a primary cell, in the subframe for monitoring the physical downlink control channel with the RNTI, in a case where the fifth information is configured for any of activated serving cells. In a case where the physical downlink control channel with the RNTI is detected in a radio frame {m·T/10, m·T/10+1, ..., (m+1)·T/10−1}, an uplink-downlink configuration for the radio frame {(m+1)·T/10, (m+1)·T/10+1, ..., (m+2)·T/10−1} in the serving cell is given by fourth information for the serving cell. The periodicity T is 20 milliseconds, 40 milliseconds, or 80 milliseconds.

(6) In the third aspect of the present invention, the uplink-downlink configuration for the radio frame {(m+1)·T/10, (m+1)·T/10+1, ..., (m+2)·T/10−1} may be used for monitoring the physical downlink control channel.

(7) According to a fourth aspect of the present invention, there is provided a base station apparatus which includes a transmission unit. The transmission unit transmits first information indicating a radio network temporary identifier (RNTI), second information, plural pieces of third information, and fourth information. The second information indicates a subframe in which the user equipment monitors a physical downlink control channel with the RNTI. Each of the plural pieces of third information indicates an uplink-downlink configuration which is transmitted on the physical downlink control channel with the RNTI. The fourth information is used for determining an index of third information for a serving cell among the plural pieces of third information. In a case where the fourth information is configured for any of activated serving cells, the physical downlink control channel with the RNTI is monitored in a common search space for a primary cell, in the subframe for monitoring the physical downlink control channel with the RNTI. In a case where the physical downlink control channel with the RNTI is detected in a radio frame {m·T/10, m·T/10+1, ..., (m+1)·T/10−1}, an uplink-downlink configuration for the radio frame {(m+1)·T/10, (m+1)·T/10+1, ..., (m+2)·T/10−1} in the serving cell is given by fourth information for the serving cell. The periodicity T is 20 milliseconds, 40 milliseconds, or 80 milliseconds.

(8) In the fourth aspect of the present invention, the uplink-downlink configuration for the radio frame {(m+1)·T/10, (m+1)·T/10+1, ..., (m+2)·T/10−1} may be used for monitoring the physical downlink control channel.

(9) According to a fifth aspect of the present invention, there is provided a communication method which is used in a base station apparatus. The communication method includes transmitting first information indicating a radio network temporary identifier (RNTI), second information, plural pieces of third information, and fourth information. The second information indicates a subframe in which the user equipment monitors a physical downlink control channel with the RNTI. Each of the plural pieces of third information indicates an uplink-downlink configuration which is transmitted on the physical downlink control channel with the RNTI. The fourth information is used for determining an index of third information for a serving cell among the plural pieces of third information. In a case where the physical downlink control channel with the RNTI is detected in a radio frame {m·T/10, m·T/10+1, ..., (m+1)·T/10−1}, an uplink-downlink configuration for the radio frame {(m+1)·T/10, (m+1)·T/10+1, ..., (m+2)·T/10−1} in the serving cell is given by fourth information for the serving cell. The periodicity T is 20 milliseconds, 40 milliseconds, or 80 milliseconds.

(10) In the fifth aspect of the present invention, the uplink-downlink configuration for the radio frame {(m+1)·T/10, (m+1)·T/10+1, ..., (m+2)·T/10−1} may be used for monitoring the physical downlink control channel.

(11) According to a sixth aspect of the present invention, there is provided an integrated circuit which is mounted in a base station apparatus and executes a series of functions. The series of functions include a function of a function of transmitting first information indicating a radio network temporary identifier (RNTI), second information, plural pieces of third information, and fourth information. The second information indicates a subframe in which the user equipment monitors a physical downlink control channel with the RNTI. Each of the plural pieces of third information indicates an uplink-downlink configuration which is transmitted on the physical downlink control channel with the RNTI. The fourth information is used for determining an index of third information for a serving cell among the plural pieces of third information. In a case where the fourth information is configured for any of activated serving cells, the physical downlink control channel with the RNTI is monitored in a common search space for a primary cell, in the subframe for monitoring the physical downlink control channel with the RNTI. In a case where the physical downlink control channel with the RNTI is detected in a radio frame {m·T/10, m·T/10+1, ..., (m+1)·T/10−1}, an uplink-downlink configuration for the radio frame {(m+1)·T/10, (m+1)·T/10+1, ..., (m+2)·T/10−1} in the serving cell is given by fourth information for the serving cell. The periodicity T is 20 milliseconds, 40 milliseconds, or 80 milliseconds.

(12) In the sixth aspect of the present invention, the uplink-downlink configuration for the radio frame {(m+1)·T/10, (m+1)·T/10+1, ..., (m+2)·T/10−1} may be used for monitoring the physical downlink control channel.

Effects of the Invention

According to any aspect of the present invention, it is possible to cause user equipment to efficiently communicate with a base station apparatus.

BRIEF DESCRIPTION OF THE DRAWINGS

FIG. 7 is a table illustrating an example of a UL-DL configuration in the embodiment.

FIG. 10 is a diagram illustrating a correspondence between a pair formed by a first UL reference UL-DL configuration for a serving cell (primary cell) and a first UL reference UL-DL configuration for another serving cell (secondary cell), and a second UL reference UL-DL configuration for the secondary cell in the embodiment.

FIG. 12 is a diagram illustrating a correspondence between a pair formed by a first DL reference UL-DL configuration for a primary cell and a first DL reference UL-DL configuration for a secondary cell, and a second DL reference UL-DL configuration for the secondary cell in the embodiment.

FIG. 13 is a diagram illustrating a correspondence between a subframe n in which a PDCCH/EPDCCH/PHICH is allocated, and a subframe (n+k) in which a PUSCH corresponding to the PDCCH/EPDCCH/PHICH is allocated, in the embodiment.

FIG. 14 is a diagram illustrating a correspondence between a subframe n in which a PUSCH is allocated, and a subframe (n+k) in which a PHICH corresponding to the PUSCH is allocated, in the embodiment.

FIG. 18 is a diagram illustrating an example of a configuration index for monitoring the DCI format 5 which includes the third information, in the embodiment.

MODE FOR CARRYING OUT THE INVENTION

Hereinafter, an embodiment according to the present invention will be described.

In the embodiment, a plurality of cells is configured for a terminal device. A technology in which the terminal device performs communication through the plurality of cells is referred to as cell aggregation or carrier aggregation. The present invention may be applied to each of a plurality of cells configured for a terminal device. The present invention may be applied to some of the configured plurality of cells. The cells configured for the terminal device are referred to as serving cells.

The configured plurality of cells includes one primary cell, and one or a plurality of secondary cells. The primary cell corresponds to a serving cell in which an initial connection establishment procedure is performed, a serving cell in which a connection re-establishment is performed, or a cell of which an instruction as a primary cell is performed in a handover procedure. The secondary cell may be configured when or after RRC connection is established.

The time division duplex (TDD) scheme is applied to a radio communication system according to the embodiment. In a case of the cell aggregation, the TDD scheme may be applied to all of a plurality of cells. In the case of the cell aggregation, a cell to which the TDD scheme is applied, and a cell to which the frequency division duplex (FDD) scheme is applied may be aggregated. In the case of the cell aggregation, the present invention may be applied to some of all of cells.

Figure 1:
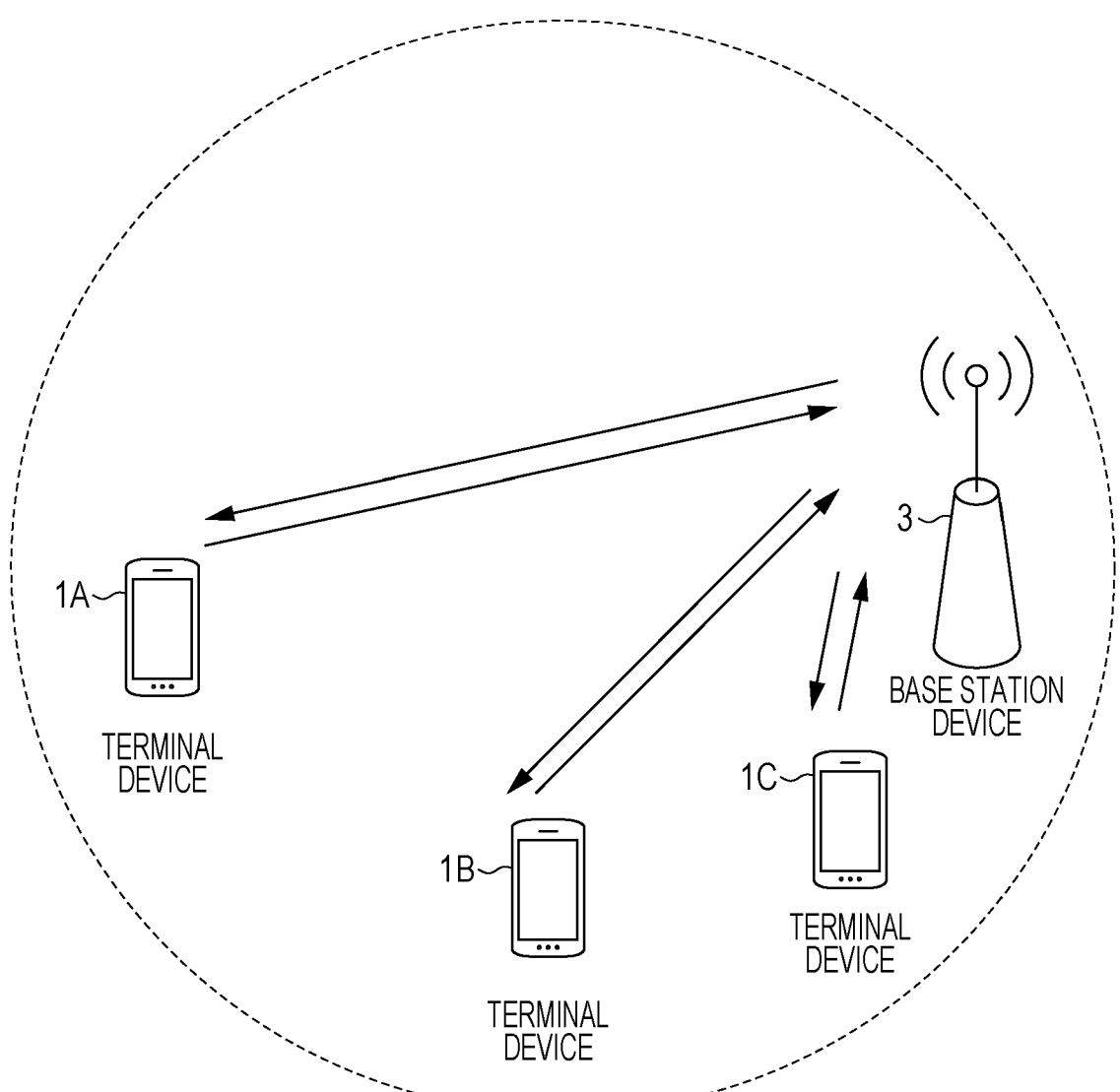
FIG. 1 is a conceptual diagram illustrating a radio communication system according to an embodiment.

FIG. 1 is a conceptual diagram of the radio communication system according to the embodiment. In FIG. 1, the radio communication system includes terminal devices 1A to 1C, and a base station apparatus 3. The terminal devices 1A to 1C are referred to as a terminal device 1 below.

A physical channel and a physical signal in the embodiment will be described.

In FIG. 1, in a radio communication of an uplink from the terminal device 1 to the base station apparatus 3, the following uplink physical channels are used. The uplink physical channels are used for transmitting information which has been output from a higher layer.

PUCCH (Physical Uplink Control Channel)
PUSCH (Physical Uplink Shared Channel)
PRACH (Physical Random Access Channel)

The PUCCH is a physical channel used for transmitting uplink control information (UCI).

The PUSCH is a physical channel used for transmitting uplink data (Uplink-Shared Channel: UL-SCH).

The PRACH is a physical channel used for transmitting a random access preamble. The PRACH is used for indicating the initial connection establishment procedure, the handover procedure, the connection re-establishment procedure, synchronization (timing adjustment) for uplink transmission, and a request for a PUSCH resource.

In FIG. 1, in the radio communication of an uplink, the following uplink physical signals are used. The uplink physical signals are not used for transmitting information which has been output from a higher layer, but used by a physical layer.

Uplink reference signal (UL RS)

In the embodiment, the following two types of uplink reference signals are used.

DMRS (Demodulation Reference Signal)

SRS (Sounding Reference Signal)

The DMRS is associated with transmission of the PUSCH or the PUCCH. The DMRS is subjected to time multiplexing along with the PUSCH or the PUCCH. The base station apparatus 3 uses the DMRS in order to perform channel compensation of the PUSCH or the PUCCH.

The SRS is not associated with the PUSCH or the PUCCH. The base station apparatus 3 uses the SRS in order to measure a channel state of the uplink. The terminal device 1 transmits a first SRS with a first resource configured by a higher layer. In a case where information indicating a request for transmitting the SRS through the PDCCH, the terminal device 1 transmits a second SRS with a second resource configured by the higher layer, only one time.

In FIG. 1, in the radio communication of a downlink from the base station apparatus 3 to the terminal device 1, the following downlink physical channels are used. The downlink physical channels are used for transmitting information which has been output from the higher layer.

PBCH (Physical Broadcast Channel)

PCFICH (Physical Control Format Indicator Channel)

PHICH (Physical Hybrid automatic repeat request Indicator Channel)

PDCCH (Physical Downlink Control Channel)

EPDCCH (Enhanced Physical Downlink Control Channel)

PDSCH (Physical Downlink Shared Channel)

PMCH (Physical Multicast Channel)

The PBCH is used for broadcasting a master information block (MIB, Broadcast Channel: BCH) which is used commonly in the terminal device 1.

The PCFICH is used for transmitting information for an instruction of a region (OFDM symbol) used in transmission of the PDCCH.

The PHICH is used for transmitting a HARQ indicator (HARQ feedback, response information) which indicates ACK (ACKnowledgement) or NACK (Negative ACKnowledgement) for uplink data (Uplink Shared Channel: UL-SCH) received by the base station apparatus 3.

The PDCCH and the EPDCCH are used for transmitting downlink control information (DCI). The downlink control information is also referred to as a DCI format. The downlink control information includes DCI format 5 used for transmitting information which indicates at least one UL-DL configuration, a downlink grant, and an uplink grant. The downlink grant is also referred to as downlink assignment or downlink allocation.

The downlink grant includes DCI format 1A and DCI format 2D. The downlink grant is used in scheduling of a single PDSCH in a single cell. The downlink grant is used in scheduling of the PDSCH in a subframe which is the same as a subframe in which the downlink grant is transmitted.

The uplink grant includes DCI format 0. The uplink grant is used in scheduling of a single PUSCH in a single cell. The uplink grant is used in scheduling of the single PUSCH in a subframe after four or more subframes from a subframe in which the uplink grant is transmitted.

A PDCCH and an EPDCCH used for transmitting the downlink grant are also referred to as a first PDCCH. The first PDCCH may be used for transmitting the uplink grant.

A PDCCH and an EPDCCH used for transmitting the DCI format 5 are also referred to as a second PDCCH.

A cyclic redundancy check (CRC) parity obtained from the DCI format is added to the DCI format. The CRC parity bit added to the DCI format is scrambled by a radio network temporary identifier (RNTI). CRC parity bits added to the uplink grant and the downlink grant are scrambled by a cell-radio network temporary identifier (C-RNTI) or a semi persistent scheduling cell-radio network temporary identifier (SPS C-RNTI). The C-RNTI and the SPS C-RNTI are identifiers for identifying a terminal device in a cell. A CRC parity bit added to the DCI format 5 is scrambled by a TDD-RNTI.

That is, the first PDCCH is specified by the C-RNTI or the SPS C-RNTI, and the second PDCCH is specified by the TDD-RNTI.

The first PDCCH is also referred to as a PDCCH with the CRC which has been scrambled by the C-RNTI or the SPS C-RNTI. The second PDCCH is also referred to as a PDCCH with the CRC which has been scrambled by the TDD-RNTI.

The downlink grant and the uplink grant may be transmitted and received in a common search space (CSS) or a UE-specific search space (USS). The CSS is a region which is used commonly for a plurality of terminal devices 1, and for monitoring the PDCCH. The USS is a region defined based on at least the cell-radio network temporary identifier (C-RNTI). The USS includes a PDCCH USS in which the PDCCH is monitored, and an EPDCCH USS in which the EPDCCH is monitored.

The base station apparatus 3 preferably transmits the second PDCCH with the DCI format 5, only in a CSS of the primary cell. The terminal device 1 preferably monitors the second PDCCH with the DCI format 5, only in the CSS of the primary cell. The terminal device 1 may attempt to decode of the second PDCCH with the DCI format 5, in the CSS of the primary cell.

The C-RNTI is used for controlling the PDSCH or the PUSCH in a single subframe. The SPS C-RNTI is used for periodically allocating resources for the PDSCH or the PUSCH.

The PDSCH is used for transmitting downlink data (Downlink Shared Channel: DL-SCH).

The PMCH is used for transmitting multicast data (Multicast Channel: MCH).

In FIG. 1, in the radio communication of the downlink, the following downlink physical signals are used. The downlink physical signals are not used for transmitting information which has been output from a higher layer, but is used by the physical layer.

Synchronization signal (SS)

Downlink reference signal (DL RS)

The synchronization signal is used for causing the terminal device 1 to perform synchronization of a frequency domain and a time domain of a downlink. In the TDD scheme, the synchronization signal is mapped on subframes 0, 1, 5, and 6 in a radio frame. In the FDD scheme, the synchronization signal is mapped on the subframes 0 and 5 in the radio frame.

The downlink reference signal is used for causing the terminal device 1 to perform channel compensation of the downlink physical channel. The downlink reference signal is used for causing the terminal device 1 to calculate channel state information of a downlink.

In the embodiment, the following five types of downlink reference signals are used.

Cell-specific Reference Signal (CRS)
UE-specific reference signal (URS) associated with PDSCH
Demodulation reference signal (DMRS) associated with EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted over the entirety of the band of subframes. The CRS is used for demodulating a PBCH/PDCCH/PHICH/PCFICH/PDSCH. The CRS may be used for causing the terminal device 1 to calculate channel state information of a downlink. The PBCH/PDCCH/PHICH/PCFICH is transmitted by using an antenna port which is used in transmission of the CRS.

The URS associated with the PDSCH is transmitted in a subframe and a band which are used in transmission of the PDSCH associated with the URS. The URS is used for demodulating the PDSCH associated with the URS.

The PDSCH is transmitted by using an antenna port which is used in transmission of the CRS or the URS. DCI format 1A is used in scheduling for the PDSCH which is transmitted by using the antenna port used in transmission of the CRS. DCI format 2D is used in scheduling for the PDSCH which is transmitted by using the antenna port used in transmission of the URS.

The DMRS associated with the EPDCCH is transmitted in a subframe and a band which are used in transmission of the EPDCCH associated with the DMRS. The DMRS is used for demodulating the EPDCCH associated with the DMRS. The EPDCCH is transmitted by using an antenna port which is used in transmission of the DMRS.

The NZP CSI-RS is transmitted in a configured subframe. The base station apparatus configures resources for transmitting the NZP CSI-RS. The NZP CSI-RS is used for causing the terminal device 1 to calculate channel state information of the downlink. The terminal device 1 performs signal measurement (channel measurement) by using the NZP CSI-RS.

The base station apparatus 3 configures resources for the ZP CSI-RS. The base station apparatus 3 transmits the ZP CSI-RS with an output of zero. That is, the base station apparatus 3 does not transmit the ZP CSI-RS. The base station apparatus 3 does not transmit the PDSCH and the EPDCCH in configured resources for the ZP CSI-RS. For example, the terminal device 1 may measure interference in resources corresponding to the NZP CSI-RS, in a certain cell.

The MBSFN RS is transmitted in the entirety of a band of a subframe used in transmission of the PMCH. The MBSFN RS is used for demodulating the PMCH. The PMCH is used by using an antenna port which is used in transmission of the MBSFN RS.

The PRS is used for causing a terminal device to measure a geographical position of the terminal device.

A downlink signal is used as a generic term of the downlink physical channel and the downlink physical signal. An uplink signal is used as a generic term of the uplink physical channel and the uplink physical signal. A physical channel is used as a generic term of the downlink physical channel and the uplink physical channel A physical signal is used as a generic term of the downlink physical signal and the uplink physical signal.

The BCH, MCH, UL-SCH, and the DL-SCH are transport channels. A channel used in a medium access control (MAC) layer is referred to as a transport channel A unit of the transport channel used in the MAC layer is referred to as a transport block (TB) or a MAC PDU (protocol data unit). A hybrid automatic repeat request (HARQ) is controlled for each transport block in the MAC layer. The transport block is a unit of data delivered to the physical layer by the MAC layer. In the physical layer, the transport block is mapped on a code word and coding is performed for each code word.

A configuration of a radio frame in the embodiment will be described below.

Figure 2:
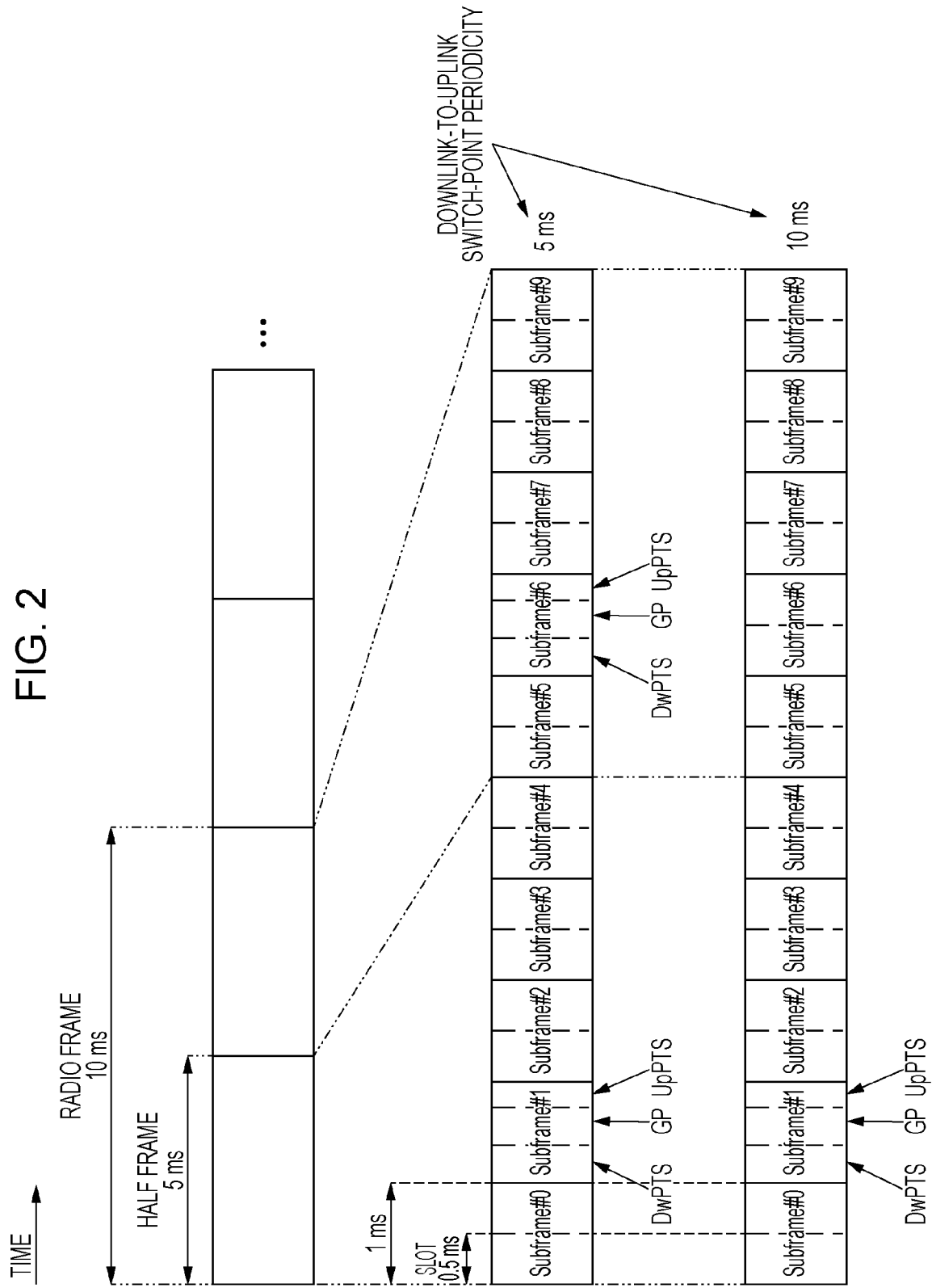
FIG. 2 is a schematic diagram illustrating a configuration of a radio frame in the embodiment.

FIG. 2 is a schematic diagram illustrating a configuration of the radio frame in the embodiment. Each radio frame has a length of 10 ms. In FIG. 2, a horizontal axis indicates a time axis. Each radio frame is constituted by two half frames. Each of the half frames has a length of 5 ms. Each of the half frames is constituted by five subframes. Each of the subframes has a length of 1 ms, and is defined by two continuous slots. Each of the slots has a length of 0.5 ms. The i-th subframe in the radio frame is constituted by the (2×i)-th slot and the (2×i+1)-th slot. That is, 10 subframes may be used at an interval of 10 ms.

In the embodiment, the following three subframes are defined.

Downlink subframe (first subframe)
Uplink subframe (second subframe)
Special subframe (third subframe)

The downlink subframe is a subframe reserved for downlink transmission. The uplink subframe is a subframe reserved for uplink transmission. The special subframe is constituted by three fields. The three fields respectively correspond to a downlink pilot time slot (DwPTS), a guard period (GP), and an uplink pilot time slot (UpPTS). The total length of the DwPTS, the GP, and the UpPTS is 1 ms. The DwPTS is a field reserved for the downlink transmission. The UpPTS is a field reserved for the uplink transmission. The GP is a field in which the downlink transmission and the uplink transmission are not performed. The special subframe may be constituted only by the DwPTS and the GP, or may be constituted only by the GP and the UpPTS.

A single radio frame is constituted by at least the downlink subframe, the uplink subframe, and the special subframe.

A configuration of the slot in the embodiment will be described below.

Figure 3:
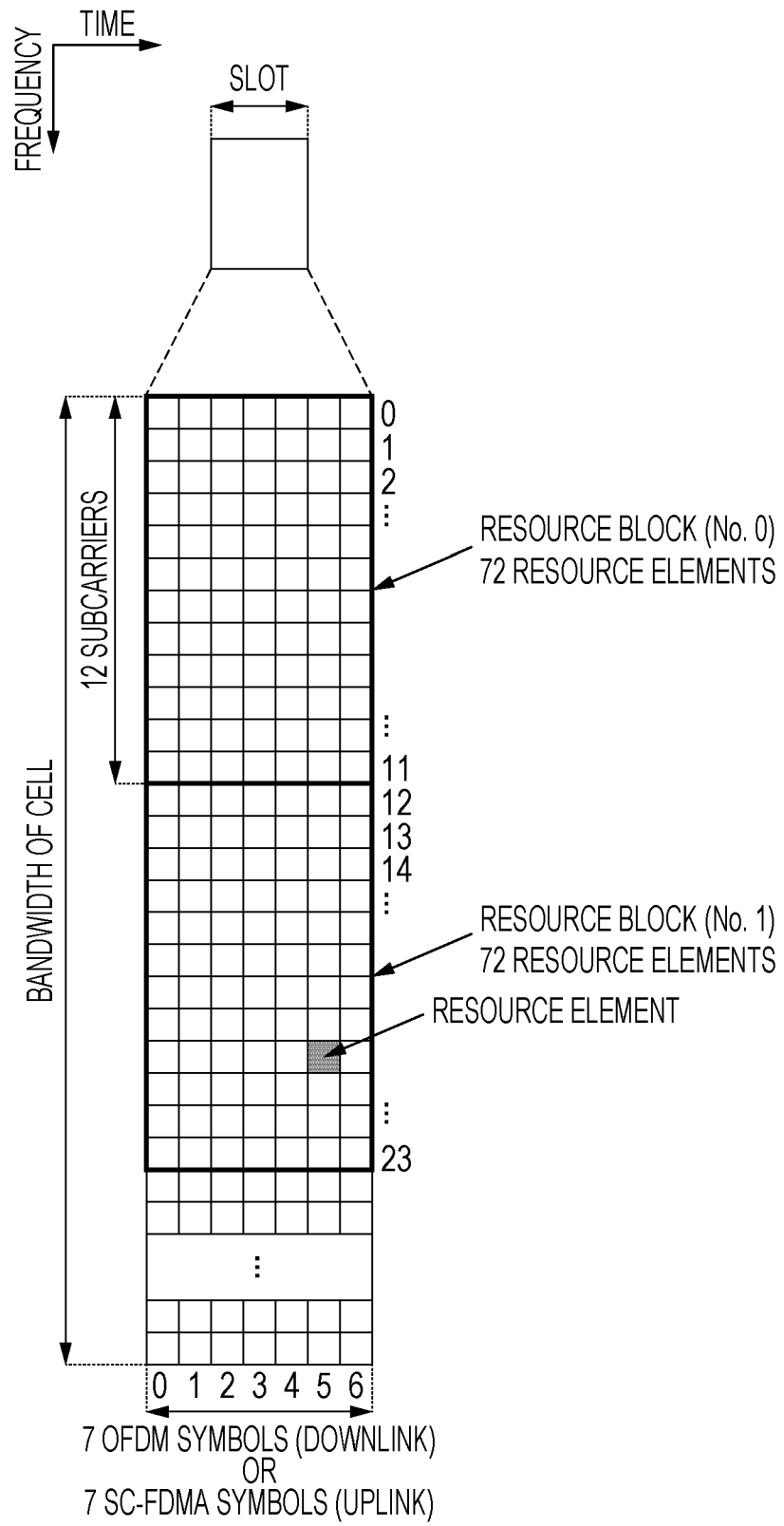
FIG. 3 is a diagram illustrating a configuration of a slot in the embodiment.

FIG. 3 is a diagram illustrating a configuration of the slot in the embodiment. In the embodiment, a normal cyclic prefix (CP) is applied to an OFDM symbol. An extended cyclic prefix (CP) may be applied to an OFDM symbol. A physical signal or a physical channel transmitted in each slot is expressed by a resource grid. In FIG. 3, a horizontal axis indicates a time axis, and a vertical axis indicates a frequency axis. In a downlink, the resource grid is defined by a plurality of subcarriers and a plurality of OFDM symbols. In an uplink, the resource grid is defined by a plurality of subcarriers and a plurality of SC-FDMA symbols. The number of subcarriers constituting one slot depends on a bandwidth of a cell. The number of OFDM symbols or SC-FDMA symbols constituting one slot is 7. Each element in the resource grid is referred to as a resource element. The resource element is identified by using the number of the subcarrier, and the number of the OFDM symbol or the number of the SC-FDMA symbol.

The resource block is used for expressing mapping of a certain physical channel (PDSCH, PUSCH, or the like) onto a resource element. In the resource block, a virtual resource block and a physical resource block are defined. The certain physical channel is firstly mapped on the virtual resource block. Then, the virtual resource block is mapped on the physical resource block. One physical resource block is defined by seven continuous OFDM symbols or seven continuous SC-FDMA symbols in the time domain, and 12 contiguous subcarriers in the frequency domain. Thus, one physical resource block is constituted from (7×12) resource elements. The one physical resource block corresponds to one slot in the time domain, and corresponds to 180 kHz in the frequency domain. Numbers from 0 are assigned to physical resource blocks in the frequency domain.

A physical channel and a physical signal transmitted in each subframe will be described below.

Figure 4:
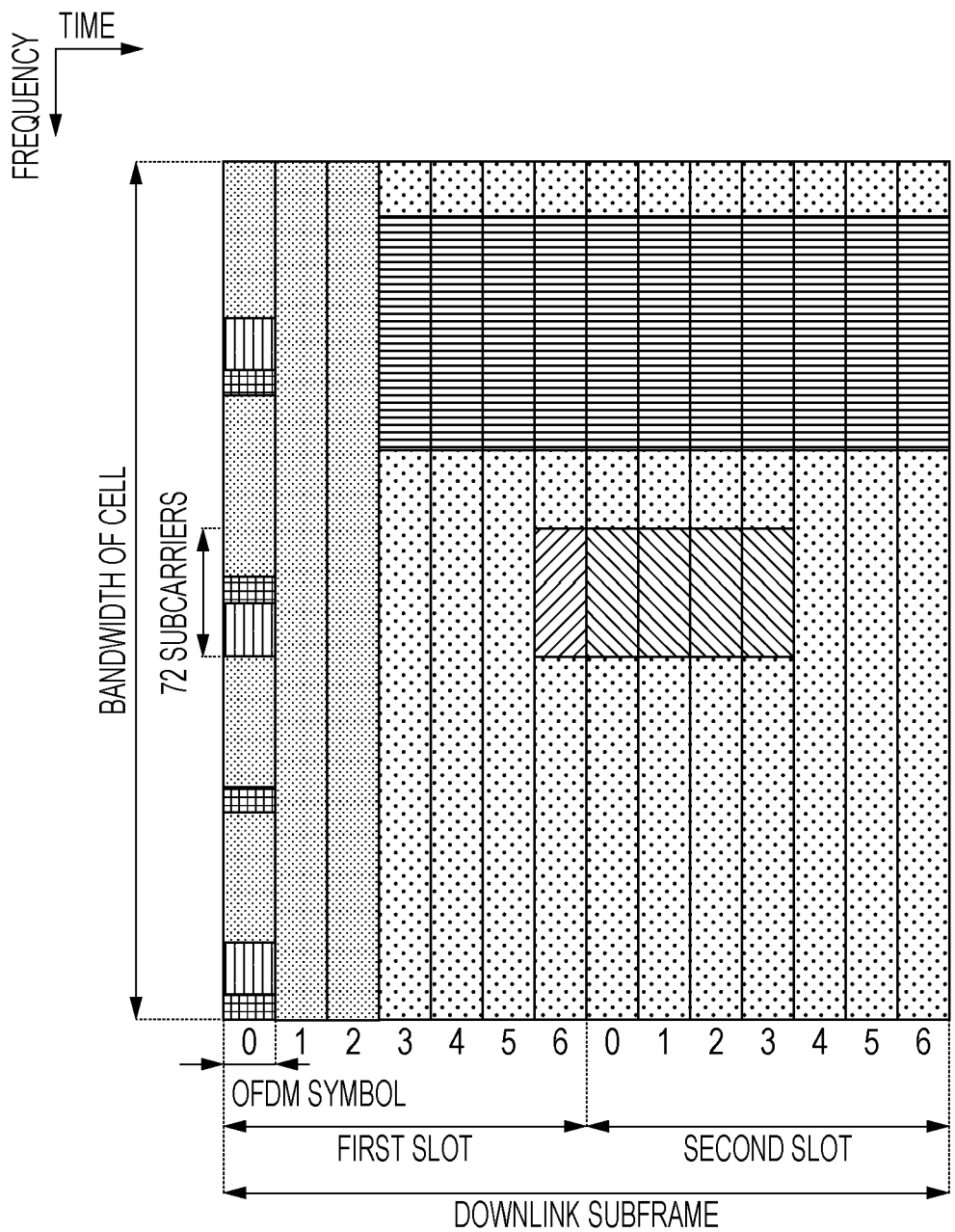
FIG. 4 is a diagram illustrating an example of allocation of a physical channel and a physical signal in a downlink subframe in the embodiment.

FIG. 4 is a diagram illustrating an example of allocation of the physical channel and the physical signal in a downlink subframe in the embodiment. In FIG. 4, a horizontal axis indicates a time axis, and a vertical axis indicates a frequency axis. The base station apparatus 3 may transmit downlink physical channels (PBCH, PCFICH, PHICH, PDCCH, EPDCCH, and PDSCH) and downlink physical signals (synchronization signal and downlink reference signal) in the downlink subframe. The PBCH is transmitted only in the subframe 0 in a radio frame. The downlink reference signal is mapped on resource elements distributed in the frequency domain and the time domain. In order to simplify descriptions, the downlink reference signal is not illustrated in FIG. 4.

In a PDCCH region, a plurality of PDCCHs may be subjected to frequency multiplexing and time multiplexing. In an EPDCCH region, a plurality of EPDCCHs may be subjected to frequency multiplexing, time multiplexing, and spatial multiplexing. In a PDSCH region, a plurality of PDSCHs may be subjected to frequency multiplexing and spatial multiplexing. The PDCCH and the PDSCH or the EPDCCH may be subjected to time multiplexing. The PDSCH and the EPDCCH may be subjected to frequency multiplexing.

Figure 5:
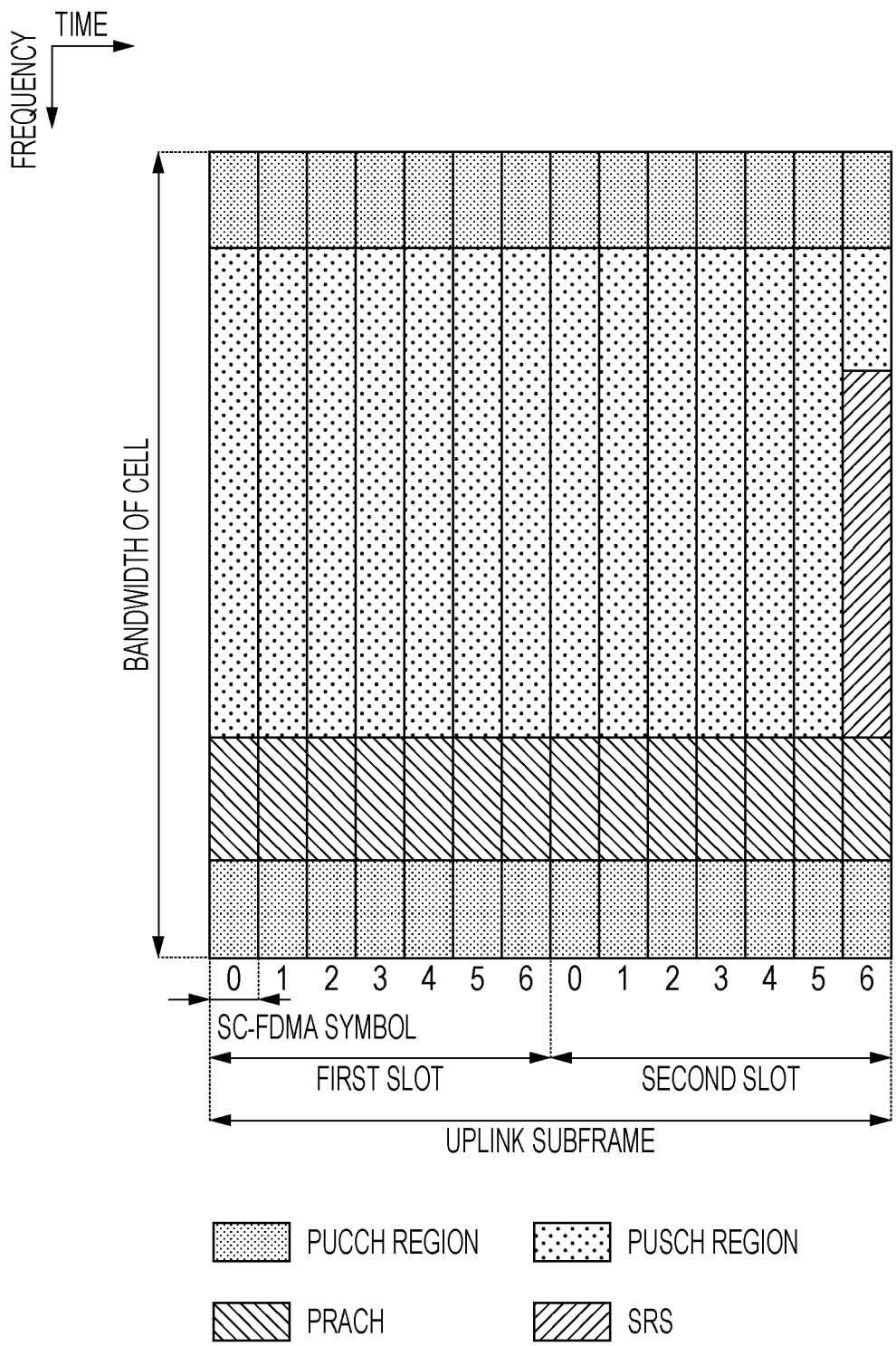
FIG. 5 is a diagram illustrating an example of allocation of a physical channel and a physical signal in an uplink subframe in the embodiment.

FIG. 5 is a diagram illustrating an example of allocation of a physical channel and a physical signal in an uplink subframe in the embodiment. In FIG. 5, a horizontal axis indicates a time axis, and a vertical axis indicates a frequency axis. The terminal device 1 may transmit uplink physical channels (PUCCH, PUSCH, and PRACH) and uplink physical signals (DMRS and SRS) in an uplink subframe. In a PUCCH region, a plurality of PUCCHs may be subjected to frequency multiplexing, time multiplexing, and code multiplexing. In a PUSCH region, a plurality of PUSCHs may be subjected to frequency multiplexing and spatial multiplexing. The PUCCH and the PUSCH may be subjected to frequency multiplexing. The PRACH may be allocated in a single subframe or two subframes. A plurality of PRACHs may be subjected to code multiplexing.

The SRS is transmitted by using the last SC-FDMA symbol in the uplink subframe. That is, the SRS is mapped on the last SC-FDMA symbol in the uplink subframe. It is impossible that the terminal device 1 transmits the SRS simultaneously with the PUCCH/PUSCH/PRACH, with a single SC-FDMA symbol in a single cell. The terminal device 1 may transmit the PUSCH and/or the PUCCH in a single uplink subframe in a single cell, by using SC-FDMA symbols except for the last SC-FDMA symbol in the uplink subframe, and may transmit the SRS by using the last SC-FDMA symbol in the uplink subframe. That is, in the single uplink subframe of the single cell, the terminal device 1 may transmit both of the SRS and the PUSCH/PUCCH. The DMRS is subjected to time multiplexing along with the PUCCH or the PUSCH. In order to simplify descriptions, the DMRS is not illustrated in FIG. 5.

Figure 6:
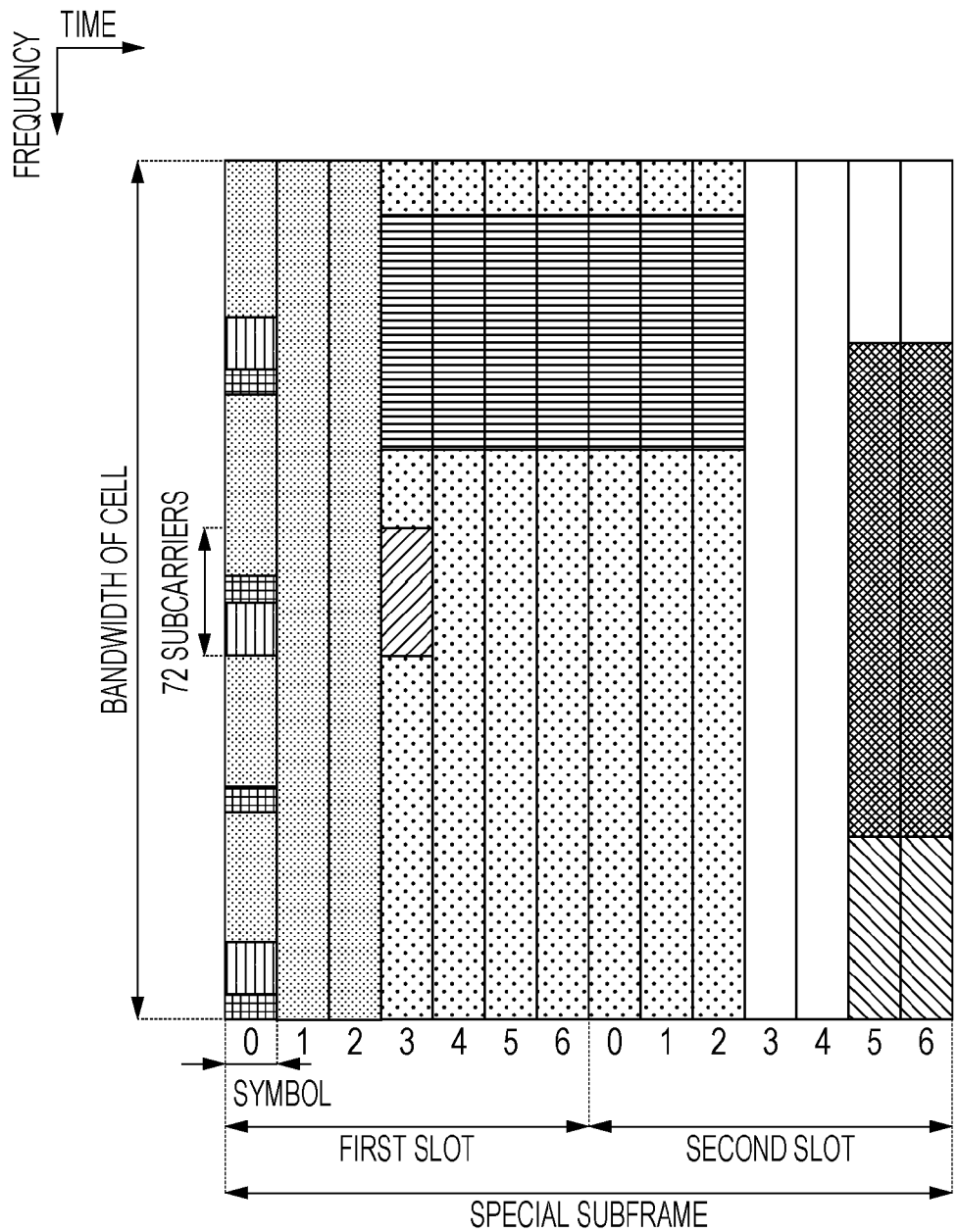
FIG. 6 is a diagram illustrating an example of allocation of a physical channel and a physical signal in a special subframe in the embodiment.

FIG. 6 is a diagram illustrating an example of allocation of a physical channel and a physical signal in a special subframe in the embodiment. In FIG. 6, a horizontal axis indicates a time axis, and a vertical axis indicates a frequency axis. In FIG. 6, the DwPTS is constituted by SC-FDMA symbols of the first SC-FDMA symbol to the tenth SC-FDMA symbol in a special subframe. The GP is constituted by the eleventh SC-FDMA symbol and the twelfth SC-FDMA symbol in the special subframe. The UpPTS is constituted by the thirteenth SC-FDMA symbol and the fourteenth SC-FDMA symbol in the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 does not transmit the PBCH in the DwPTS of the special subframe. The terminal device 1 may transmit the PRACH and the SRS in the UpPTS of the special subframe. That is, the terminal device 1 does not transmit the PUCCH, the PUSCH, and the DMRS in the UpPTS of the special subframe.

A first UL reference UL-DL configuration (uplink reference uplink-downlink configuration), a first DL reference UL-DL configuration (downlink reference uplink-downlink configuration), a second UL reference UL-DL configuration, a second DL reference UL-DL configuration, and a transmission direction UL-DL configuration (transmission direction uplink-downlink configuration) will be described below.

The first UL reference UL-DL configuration, the first DL reference UL-DL configuration, the second UL reference UL-DL configuration, the second DL reference UL-DL configuration, and the transmission direction UL-DL configuration are defined by an UL-DL configuration (uplink-downlink configuration, UL-DL configuration).

The UL-DL configuration is a configuration relating to a pattern of subframes in a radio frame. The UL-DL configuration indicates which subframe of the downlink subframe, the uplink subframe, and the special subframe is each of the subframes in the radio frame.

That is, the first UL reference UL-DL configuration, the second UL reference UL-DL configuration, the first DL reference UL-DL configuration, the second DL reference UL-DL configuration, and the transmission direction UL-DL configuration are defined by a pattern of the downlink subframe, the uplink subframe, and the special subframe in the radio frame.

The pattern of the downlink subframe, the uplink subframe, and the special subframe indicates which one of the downlink subframe, the uplink subframe, and the special subframe corresponds to each of subframes from the subframe #0 to the subframe #9. Preferably, the pattern is expressed by any combination of D, U, and S (which respectively indicate the downlink subframe, the uplink subframe, and the special subframe) in which the total length of D, U, and S are set to 10. More preferably, the leading subframe (that is, subframe #0) is D and the second subframe (that is, subframe #1) is S.

FIG. 7 is a table illustrating an example of the UL-DL configuration in the embodiment. In FIG. 7, D indicates the downlink subframe, U indicates the uplink subframe, and S indicates the special subframe.

Setting of an UL-DL configuration i as the first or second UL reference UL-DL configuration is referred to as setting of a first or second UL reference UL-DL configuration i. Setting of the UL-DL configuration i as the first or second DL reference UL-DL configuration is referred to as setting of a first or second DL reference UL-DL configuration i. Setting of the UL-DL configuration i as the transmission direction UL-DL configuration is referred to as setting of a transmission direction UL-DL configuration i.

A setting method for the first UL reference UL-DL configuration, the first DL reference UL-DL configuration, and the transmission direction UL-DL configuration will be described below.

The base station apparatus 3 determines a first UL reference UL-DL configuration, a first DL reference UL-DL configuration, and a transmission direction UL-DL configuration. The base station apparatus 3 transmits first information (TDD-Config) indicating the first UL reference UL-DL configuration, second information indicating the first DL reference UL-DL configuration, and third information indicating the transmission direction UL-DL configuration, to the terminal device 1.

The first UL reference UL-DL configuration, a second UL reference UL-DL configuration, the first DL reference UL-DL configuration, a second DL reference UL-DL configuration, and the transmission direction UL-DL configuration may be defined for each of a plurality of serving cells.

The base station apparatus 3 transmits the first information, the second information, and the third information for each of the serving cells, to the terminal device 1 in which a plurality of serving cells is configured. The first information, the second information, and the third information may be defined for each of the serving cells.

The terminal device 1 in which the plurality of serving cells is configured may set the first UL reference UL-DL configuration, the first DL reference UL-DL configuration, and the transmission direction DL-UL configuration for each of the serving cells, based on the first information, the second information, and the third information.

The first information for a primary cell is preferably included in System information block type 1 message or an RRC message. The first information for a secondary cell is preferably included in an RRC message. The second information for the primary cell is preferably included in an RRC message. The second information for the secondary cell is preferably included in an RRC message. The third information for the primary cell is preferably included in the DCI format 5. The third information for the secondary cell is preferably included in the DCI format 5.

The System information block type 1 message is initially transmitted through the PDSCH in the subframe 5 of a radio frame in which the SFN mod 8=0 is satisfied, and is re-transmitted (repeated) in the subframe 5 of another radio frame in which the SFN mod 2=0 is satisfied. The System information block type 1 message includes information indicating a constitution of the special subframe (lengths of the DwPTS, the GP, and the UpPTS). The System information block type 1 message is cell-specific information.

The RRC message is transmitted through the PDSCH. The RRC message corresponds to information/signal processed in the RRC layer. The RRC message may be common for a plurality of terminal devices 1 in a cell, or may be dedicated for a specific terminal device 1.

A setting method of the first UL reference UL-DL configuration and the first DL reference UL-DL configuration will be described in detail below.

Figure 8:
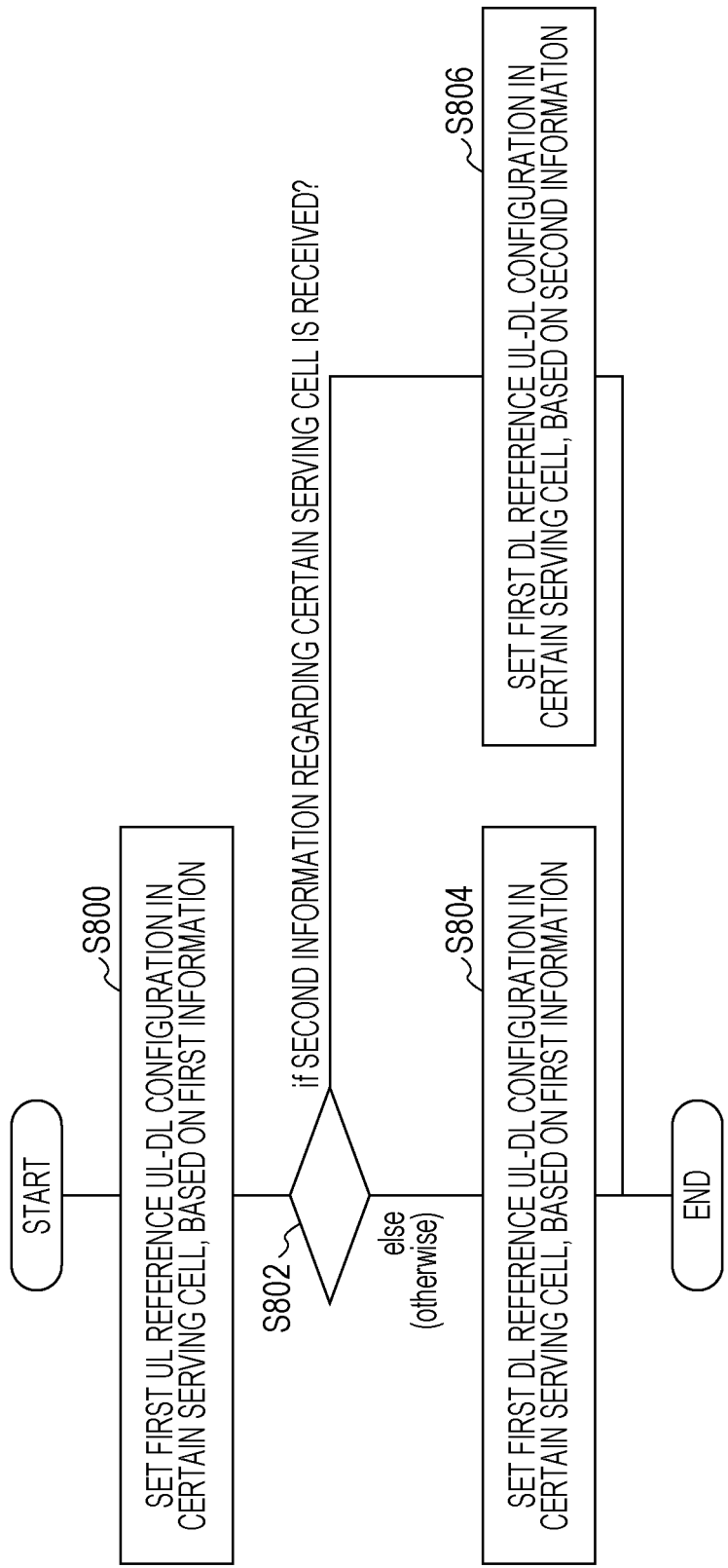
FIG. 8 is a flowchart illustrating a setting method of a first UL reference UL-DL configuration and a first DL reference UL-DL configuration in the embodiment.

FIG. 8 is a flowchart illustrating the setting method of the first UL reference UL-DL configuration and the first DL reference UL-DL configuration according to the embodiment. The terminal device 1 conducts the setting method in FIG. 8, for each of a plurality of serving cells.

The terminal device 1 sets a first UL reference UL-DL configuration for a certain serving cell, based on the first information (S800). The terminal device 1 determines whether or not the second information for the certain serving cell is received (S802). In a case where the terminal device 1 receives the second information for the certain serving cell, the terminal device 1 sets a first DL reference UL-DL configuration for the certain serving cell, based on the second information for the certain serving cell (S806). In a case where the terminal device 1 does not receive the second information for the certain serving cell (else/otherwise), the terminal device 1 sets a first DL reference UL-DL configuration for the certain serving cell, based on the first information for the certain serving cell (S804).

A serving cell in which the first UL reference UL-DL configuration and the first DL reference UL-DL configuration are set based on the first information is also referred to as a serving cell in which dynamic TDD is not configured. A serving cell in which the first DL reference UL-DL configuration is set based on the second information is also referred to as a serving cell in which dynamic TDD is configured.

In a case where the second information for the certain serving cell is not received, the first UL reference UL-DL configuration and the first DL reference UL-DL configuration may be not defined. In a case where the second information for the certain serving cell is not received, the terminal device 1 may set one UL-DL configuration for the certain serving cell, based on the first information for the certain serving cell.

The first UL reference UL-DL configuration is used at least for specifying a subframe in which transmission of the uplink is allowable or not allowable, in a serving cell. The terminal device 1 does not transmit the uplink in a subframe of which an instruction as a downlink subframe is performed by the first UL reference UL-DL configuration. The terminal device 1 does not transmit the uplink in the DwPTS and the GP of a subframe of which an instruction as a special subframe is performed by the first UL reference UL-DL configuration.

The first DL reference UL-DL configuration is used at least for specifying a subframe in which transmission of a downlink is allowable or not allowable, in a serving cell. The terminal device 1 does not transmit the downlink in a subframe of which an instruction as an uplink subframe is performed by the first DL reference UL-DL configuration. The terminal device 1 does not transmit the downlink in the UpPTS and the GP of a subframe of which an instruction as a special subframe is performed by the first DL reference UL-DL configuration.

The terminal device 1 which sets the first DL reference UL-DL configuration based on the first information may perform measurement by using a downlink signal in the DwPTS of a downlink subframe or a special subframe of which an instruction is performed by the first UL reference UL-DL configuration or the first DL reference UL-DL configuration (for example, measurement relating to channel state information).

A setting method of the second UL reference UL-DL configuration will be described below.

In a case where a plurality of serving cells is configured for the terminal device 1, and first UL reference UL-DL configurations for at least two serving cells are different from each other, the terminal device 1 and the base station apparatus 3 set the second UL reference UL-DL configuration.

In cases other than the case where a plurality of serving cells is configured for the terminal device 1, and first UL reference UL-DL configurations for at least two serving cells are different from each other, the terminal device 1 and the base station apparatus 3 may not set the second UL reference UL-DL configuration.

Cases other than a case where first UL reference UL-DL configurations for at least two serving cells are different from each other correspond to a case where first UL reference UL-DL configurations for all serving cells are the same as each other. In a case where one serving cell is configured for the terminal device 1, the terminal device 1 and the base station apparatus 3 may not set the second UL reference UL-DL configuration.

Figure 9:
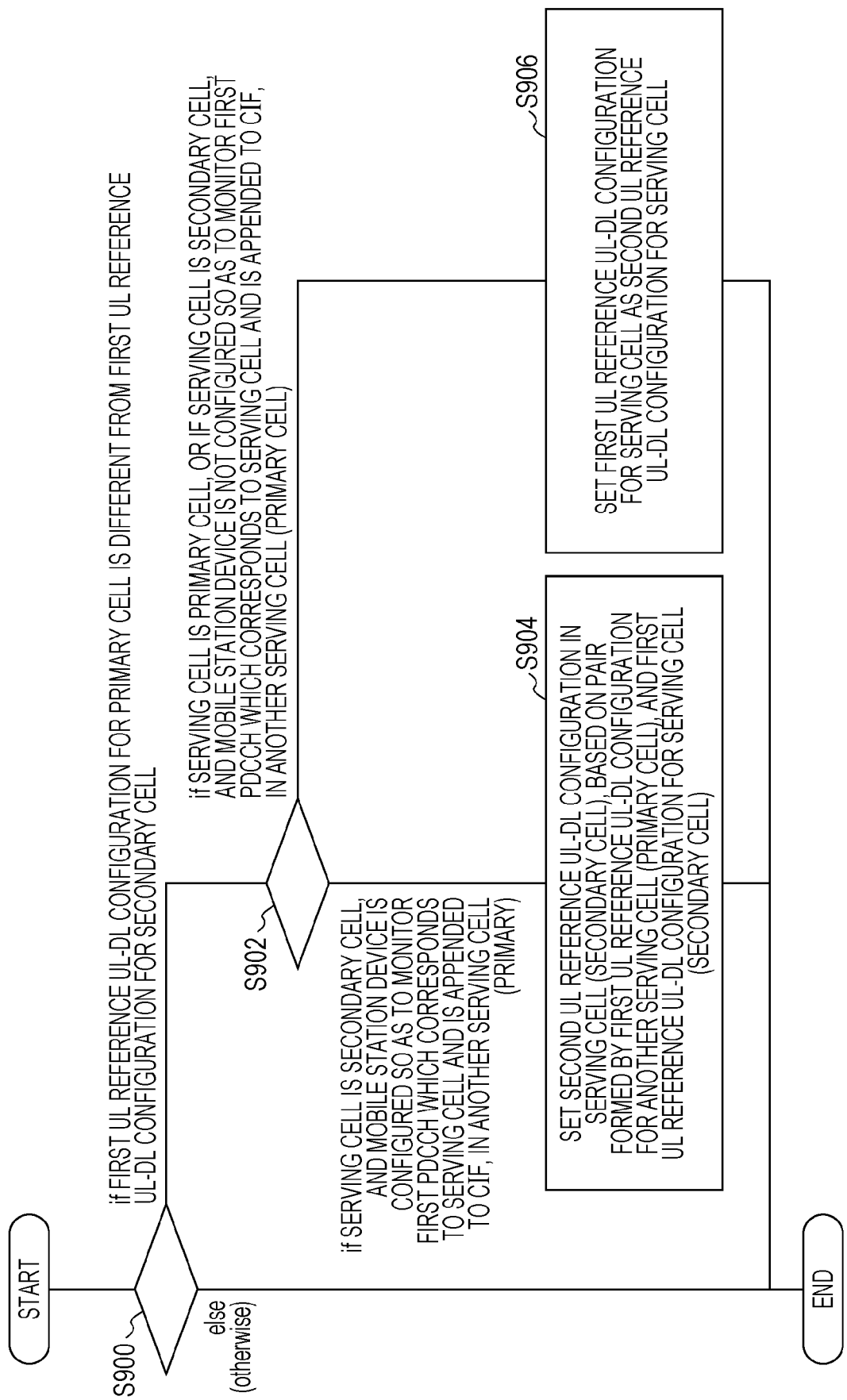
FIG. 9 is a flowchart illustrating a setting method of a second UL reference UL-DL configuration in the embodiment.

FIG. 9 is a flowchart illustrating the setting method of the second UL reference UL-DL configuration in the embodiment. In FIG. 9, one primary cell and one secondary cell are configured for the terminal device 1. The terminal device 1 conducts the setting method in FIG. 9, for each of the primary cell and the secondary cell.

The terminal device 1 determines whether or not the first UL reference UL-DL configuration for the primary cell is different from the first UL reference UL-DL configuration for the secondary cell (S900). In a case where the first UL reference UL-DL configuration for the primary cell is the same as the first UL reference UL-DL configuration for the secondary cell, the terminal device 1 does not set the second UL reference UL-DL configuration, and ends setting processing of the second UL reference UL-DL configuration.

In a case where the first UL reference UL-DL configuration for the primary cell is different from the first UL reference UL-DL configuration for the secondary cell, the terminal device 1 determines whether the serving cell is the primary cell or the secondary cell, and/or determines whether configuring so as to monitor a first PDCCH which corresponds to the serving cell and has an attached carrier indicator field (CIF) is performed in another serving cell (S902).

In a case where the serving cell is the secondary cell, and the terminal device 1 is configured so as to monitor the first PDCCH which corresponds to the serving cell (secondary cell) and has an attached CIF in the other serving cell (primary cell), the terminal device 1 sets the second UL reference UL-DL configuration for the serving cell (secondary cell) based on a pair formed by the first UL reference UL-DL configuration for the other serving cell (primary cell), and the first UL reference UL-DL configuration for the serving cell (secondary cell) (S904).

In S904, the terminal device 1 sets the second UL reference UL-DL configuration for the serving cell (secondary cell), based on the table in FIG. 10. FIG. 10 is a diagram illustrating a correspondence between the pair formed by the first UL reference UL-DL configuration for the other serving cell (primary cell), and the first UL reference UL-DL configuration for the serving cell (secondary cell), and the second UL reference UL-DL configuration for the secondary cell.

In FIG. 10, the UL-DL configuration for the primary cell refers to the first UL reference UL-DL configuration for the other serving cell (primary cell). In FIG. 10, the UL-DL configuration for the secondary cell refers to the first UL reference UL-DL configuration for the serving cell (secondary cell).

For example, in a case where the terminal device 1 sets the first UL reference UL-DL configuration 0 for the other serving cell (primary cell), and sets the first UL reference UL-DL configuration 2 for the serving cell (secondary cell), the terminal device 1 sets the second UL reference UL-DL configuration 1 for the secondary cell.

In a case where the serving cell is the primary cell, or the serving cell is the secondary cell, and the terminal device 1 is not configured so as to monitor the first PDCCH which corresponds to the serving cell (secondary cell) and has an attached CIF in the other serving cell (primary cell), the terminal device 1 sets the first UL reference UL-DL configuration for the serving cell, and sets the second UL reference UL-DL configuration for the serving cell (S906).

The base station apparatus 3 sets the second UL reference UL-DL configuration based on the setting method in FIG. 9.

Monitoring the first PDCCH which has an attached CIF means that an attempt to decode the first PDCCH is performed in accordance with the DCI format including the CIF. The CIF is a field on which a carrier indicator is mapped. The value of the carrier indicator indicates a serving cell corresponding to a DCI format which is associated with the carrier indicator.

The terminal device 1 which is configured so as to monitor the first PDCCH which corresponds to the serving cell and has an attached CIF, in the other serving cell monitors the first PDCCH having an attached CIF in the other serving cell.

The terminal device 1 which is not configured so as to monitor the first PDCCH which corresponds to the serving cell and has an attached CIF, in the other serving cell monitors a first PDCCH which has an attached CIF or does not have an attached CIF, in the serving cell.

The terminal device 1 which is not configured so as to monitor the first PDCCH which corresponds to the serving cell and has an attached CIF, in the other serving cell preferably transmits third information for the serving cell through the first PDCCH in the serving cell.

The first PDCCH for the primary cell is transmitted in the primary cell.

The base station apparatus 3 transmits a parameter (cif-Presence-r10) to the terminal device 1. The parameter (cif-Presence-r10) indicates whether or not the CIF is included in a DCI format transmitted in the primary cell.

The base station apparatus 3 transmits a parameter (CrossCarrierSchedulingConfig-r10) associated with cross carrier scheduling, to the terminal device 1 for each secondary cell.

The parameter (CrossCarrierSchedulingConfig-r10) includes a parameter (schedulingCellInfo-r10) indicating whether the first PDCCH corresponding to the associated secondary cell is transmitted in the secondary cell or is transmitted in the other serving cell.

In a case where the parameter (schedulingCellInfo-r10) indicates that the first PDCCH corresponding to the associated secondary cell is transmitted in the secondary cell, the parameter (schedulingCellInfo-r10) includes the parameter (cif-Presence-r10) indicating whether or not the CIF is included in a DCI format (downlink assignment, uplink grant) transmitted in the secondary cell.

In a case where the parameter (schedulingCellInfo-r10) indicates that the first PDCCH corresponding to the associated secondary cell is transmitted in the other serving cell, the parameter (schedulingCellInfo-r10) includes a parameter (schedulingCellId) indicating a serving cell in which downlink allocation and the uplink grant for the associated secondary cell are transmitted.

A setting method of the second DL reference UL-DL configuration will be described below.

In a case where a plurality of serving cells is configured for the terminal device 1, and first DL reference UL-DL configurations for at least two serving cell are different from each other, the terminal device 1 and the base station apparatus 3 set the second DL reference UL-DL configuration. In cases other than the case where a plurality of serving cells is configured for the terminal device 1, and first DL reference UL-DL configurations for at least two serving cells are different from each other, the terminal device 1 and the base station apparatus 3 may not set the second DL reference UL-DL configuration.

Cases other than a case where first DL reference UL-DL configurations for at least two serving cells are different from each other correspond to a case where first DL reference UL-DL configurations for all serving cells are the same as each other. In a case where one serving cell is configured for the terminal device 1, the terminal device 1 and the base station apparatus 3 may not set the second DL reference UL-DL configuration.

Figure 11:
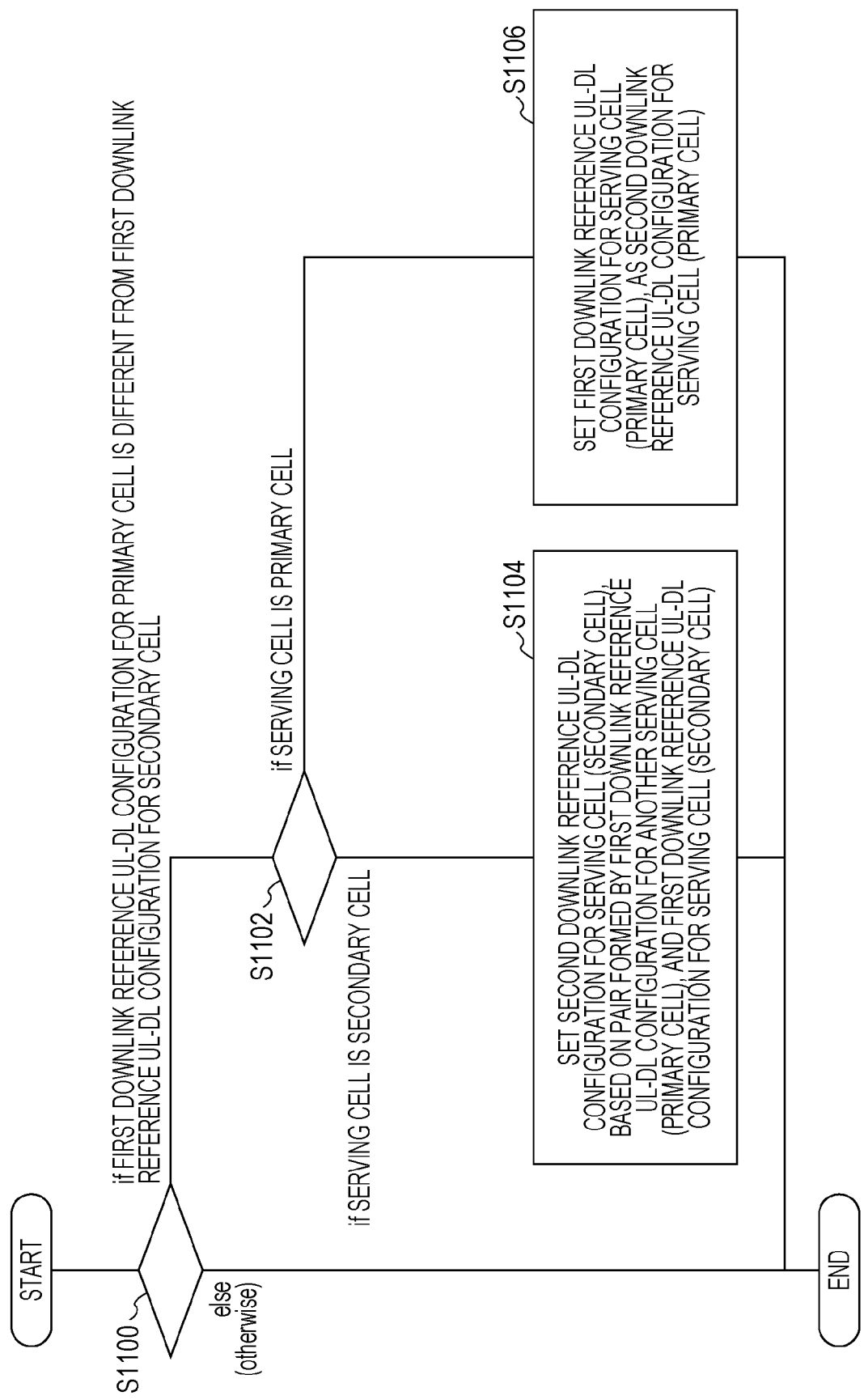
FIG. 11 is a flowchart illustrating a setting method of a second DL reference UL-DL configuration in the embodiment.

FIG. 11 is a flowchart illustrating the setting method of a second DL reference UL-DL configuration in the embodiment. In FIG. 11, one primary cell and one secondary cell are configured for the terminal device 1. The terminal device 1 conducts the setting method in FIG. 11, for each of the primary cell and the secondary cell.

The terminal device 1 determines whether or not the first DL reference UL-DL configuration for the primary cell is different from the first DL reference UL-DL configuration for the secondary cell (S1100). In a case where the first DL reference UL-DL configuration for the primary cell is the same as the first DL reference UL-DL configuration for the secondary cell, the terminal device 1 does not set the second DL reference UL-DL configuration, and ends setting processing of the second DL reference UL-DL configuration.

In a case where the first DL reference UL-DL configuration for the primary cell is different from the first DL reference UL-DL configuration for the secondary cell, the terminal device 1 determines whether the serving cell is the primary cell or the secondary cell (S1102).

In a case where the serving cell is the secondary cell, the terminal device 1 sets the second UL reference UL-DL configuration for the serving cell (secondary cell) based on a pair formed by the first DL reference UL-DL configuration for the other serving cell (primary cell), and the first DL reference UL-DL configuration for the serving cell (secondary cell) (S1104).

In S1104, the terminal device 1 sets the second DL reference UL-DL configuration for the serving cell (secondary cell), based on the table in FIG. 12. FIG. 12 is a diagram illustrating a correspondence between the pair formed by the first DL reference UL-DL configuration for the primary cell, and the first DL reference UL-DL configuration for the secondary cell, and the second DL reference UL-DL configuration for the secondary cell.

In FIG. 12, the UL-DL configuration for the primary cell refers to the first DL reference UL-DL configuration for the primary cell. In FIG. 12, the UL-DL configuration for the secondary cell refers to the first DL reference UL-DL configuration for the secondary cell.

In a case where the pair formed by the first DL reference UL-DL configuration for the primary cell and the first DL reference UL-DL configuration for the secondary cell belongs to Set 1 in FIG. 12, the second DL reference UL-DL configuration for the secondary cell is defined in the Set 1.

In a case where the terminal device 1 is not configured so as to monitor the first PDCCH which corresponds to the secondary cell and has an attached CIF in the primary cell, and the pair formed by the first DL reference UL-DL configuration for the primary cell and the first DL reference UL-DL configuration for the secondary cell belongs to Set 2 in FIG. 12, the second DL reference UL-DL configuration for the secondary cell is defined in the Set 2.

In a case where the terminal device 1 is not configured so as to monitor the first PDCCH which corresponds to the secondary cell and has an attached CIF in the primary cell, and the pair formed by the first DL reference UL-DL configuration for the primary cell and the first DL reference UL-DL configuration for the secondary cell belongs to Set 3 in FIG. 12, the second DL reference UL-DL configuration for the secondary cell is defined in the Set 3.

In a case where the terminal device 1 is configured so as to monitor the first PDCCH which corresponds to the secondary cell and has an attached CIF in the primary cell, and the pair formed by the first DL reference UL-DL configuration for the primary cell and the first DL reference UL-DL configuration for the secondary cell belongs to Set 4 in FIG. 12, the second DL reference UL-DL configuration for the secondary cell is defined in the Set 4.

In a case where the terminal device 1 is configured so as to monitor the first PDCCH which corresponds to the secondary cell and has an attached CIF in the primary cell, and the pair formed by the first DL reference UL-DL configuration for the primary cell and the first DL reference UL-DL configuration for the secondary cell belongs to Set 5 in FIG. 12, the second DL reference UL-DL configuration for the secondary cell is defined in the Set 5.

For example, in a case where the terminal device 1 sets the first DL reference UL-DL configuration 1 for the primary cell, and sets the first DL reference UL-DL configuration 0 for the secondary cell, the terminal device 1 sets the second DL reference UL-DL configuration 1 for the secondary cell.

In a case where the serving cell is the primary cell, the terminal device 1 sets the first DL reference UL-DL configuration for the serving cell (primary cell) as the second DL reference UL-DL configuration for the serving cell (primary cell) (S1106).

The base station apparatus 3 sets the second DL reference UL-DL configuration based on the setting method in FIG. 11.

The first UL reference UL-DL configuration and the second UL reference UL-DL configuration are referred to as an UL reference UL-DL configuration. The first DL reference UL-DL configuration and the second DL reference UL-DL configuration are referred to as a DL reference UL-DL configuration.

In the following descriptions, in a case where one primary cell is configured, or in a case where one primary cell and one secondary cell are configured and the first UL reference UL-DL configuration for the primary cell is the same as the first UL reference UL-DL configuration for the secondary cell, the first UL reference UL-DL configuration is used as the UL reference UL-DL configuration.

In a case where one primary cell and one secondary cell are configured and the first UL reference UL-DL configuration for the primary cell is different from the first UL reference UL-DL configuration for the secondary cell, the second UL reference UL-DL configuration is used as the UL reference UL-DL configuration.

In a case where one primary cell is configured, or in a case where one primary cell and one secondary cell are configured and the first DL reference UL-DL configuration for the primary cell is the same as the first DL reference UL-DL configuration for the secondary cell, the first DL reference UL-DL configuration is used as the DL reference UL-DL configuration.

In a case where one primary cell and one secondary cell are configured and the first DL reference UL-DL configuration for the primary cell is different from the first DL reference UL-DL configuration for the secondary cell, the second DL reference UL-DL configuration is used as the DL reference UL-DL configuration.

A subframe of which an instruction as an uplink subframe is performed by the UL reference UL-DL configuration, and a subframe of which an instruction as a downlink subframe is performed by the DL reference UL-DL configuration are also referred to as first flexible subframes. The first flexible subframe is a subframe reserved for transmitting an uplink and a downlink. That is, the first flexible subframe is a subframe used as an uplink subframe or a downlink subframe.

A subframe of which an instruction as a special subframe is performed by the UL reference UL-DL configuration, and a subframe of which an instruction as a downlink subframe is performed by the DL reference UL-DL configuration are also referred to as second flexible subframes. The second flexible subframe is a subframe reserved for transmitting a downlink. The second flexible subframe is a subframe reserved for transmitting a downlink in the DwPTS, and for transmitting an uplink in the UpPTS. That is, the second flexible subframe is a subframe used as a downlink subframe or a special subframe.

The UL reference UL-DL configuration will be described below in detail.

The UL reference UL-DL configuration is used for specifying (selecting, determining) a correspondence between a subframe n in which a PDCCH/EPDCCH/PHICH is allocated, and a subframe (n+k) in which a PUSCH corresponding to the PDCCH/EPDCCH/PHICH is allocated.

In a plurality of serving cells is configured, in each of the plurality of serving cells, the corresponding UL reference UL-DL configuration is used for determining a correspondence between a subframe in which a PDCCH/EPDCCH/PHICH is allocated, and a subframe in which a PUSCH corresponding to the PDCCH/EPDCCH/PHICH is allocated.

FIG. 13 is a diagram illustrating a correspondence between a subframe n in which a PDCCH/EPDCCH/PHICH is allocated, and a subframe (n+k) in which a PUSCH corresponding to the PDCCH/EPDCCH/PHICH is allocated. The terminal device 1 specifies (selects, determines) the value of k in accordance with the table in FIG. 13.

The UL reference UL-DL configuration is simply referred to as an UL-DL configuration in the following descriptions for FIG. 13.

In FIG. 13, in a case where one primary cell is configured, or in a case where one primary cell and one secondary cell are configured and the first UL reference UL-DL configuration for the primary cell is the same as the first UL reference UL-DL configuration for the secondary cell, the UL-DL configuration refers to the first UL reference UL-DL configuration.

In FIG. 13, in a case where one primary cell and one secondary cell are configured and the first UL reference UL-DL configuration for the primary cell is different from the first UL reference UL-DL configuration for the secondary cell, the UL-DL configuration refers to the second UL reference UL-DL configuration.

In a case where a PDCCH/EPDCCH which corresponds to a serving cell in which UL-DL configurations from the UL-DL configuration 1 to the UL-DL configuration 6 are set, and has an attached an uplink grant in which the terminal device 1 is set as a target, is detected in the subframe n, the terminal device 1 transmits the PUSCH in accordance with the uplink grant, in the subframe (n+k) specified (selected, determined) based on the table in FIG. 13.

In a case where a PHICH which corresponds to a serving cell in which UL-DL configurations from the UL-DL configuration 1 to the UL-DL configuration 6 are set, and has attached NACK in which the terminal device 1 is set as a target, is detected in the subframe n, the terminal device 1 transmits the PUSCH in the subframe (n+k) specified (selected, determined) based on the table in FIG. 13.

A two-bit uplink index (UL index) is included in an uplink grant which is caused to set the terminal device 1 as a target, and corresponds to a serving cell in which the UL-DL configuration 0 is configured. An uplink index (UL index) is not included in an uplink grant which is caused to set the terminal device 1 as a target, and corresponds to a serving cell in which UL-DL configurations from the UL-DL configuration 1 to the UL-DL configuration 6 are configured.

In a case where the most significant bit (MSB) of an uplink index included in an uplink grant which corresponds to a serving cell in which the UL-DL configuration 0 is set, is set to 1 in a subframe n, the terminal device 1 adjusts transmission of a PUSCH in accordance with the uplink grant, in a subframe (n+k) specified (selected, determined) based on the table in FIG. 13.

In a case where the terminal device 1 receives a PHICH having attached NACK which corresponds to a serving cell in which the UL-DL configuration 0 is set, in a first resource set in a subframe n (n is 0 or 5), the terminal device 1 adjusts transmission of a PUSCH in accordance with the PHICH, in a subframe (n+k) specified (selected, determined) based on the table in FIG. 13.

In a case where the least significant bit (LSB) of an uplink index included in an uplink grant which corresponds to a serving cell in which the UL-DL configuration 0 is set, is set to 1 in a subframe n, the terminal device 1 adjusts transmission of a PUSCH in accordance with the uplink grant, in a subframe (n+7).

In a case where the terminal device 1 receives a PHICH having attached NACK which corresponds to a serving cell in which the UL-DL configuration 0 is set, in a second resource set in a subframe n (n is 0 or 5), the terminal device 1 adjusts transmission of a PUSCH in accordance with the uplink grant, in a subframe (n+7).

In a case where the terminal device 1 receives a PHICH having attached NACK which corresponds to a serving cell in which the UL-DL configuration 0 is set, in a subframe n (n is 1 or 6), the terminal device 1 adjusts transmission of a PUSCH in accordance with the uplink grant, in a subframe (n+7).

For example, in a case where a PDCCH/EPDCCH/PHICH corresponding to the serving cell in which the UL-DL configuration 0 is set is detected in [SFN=m, subframe 1], the terminal device 1 adjusts transmission of the PUSCH in a subframe [SFN=m, subframe 7] after six frames.

The UL reference UL-DL configuration is used for specifying (selecting, determining) a correspondence between a subframe n in which a PUSCH is allocated, and a subframe (n+k) in which a PHICH corresponding to the PUSCH is allocated.

In a plurality of serving cells is configured, in each of the plurality of serving cells, the corresponding UL reference UL-DL configuration is used for specifying (selecting, determining) a correspondence between a subframe n in which a PUSCH is allocated, and a subframe (n+k) in which a PHICH corresponding to the PUSCH is allocated.

FIG. 14 is a diagram illustrating a correspondence between a subframe n in which a PUSCH is allocated, and a subframe (n+k) in which a PHICH corresponding to the PUSCH is allocated. The terminal device 1 specifies (selects, determines) the value of k in accordance with the table in FIG. 14.

The UL reference UL-DL configuration is simply referred to as an UL-DL configuration in the following descriptions for FIG. 14.

In FIG. 14, in a case where one primary cell is configured, or in a case where one primary cell and one secondary cell are configured and the first UL reference UL-DL configuration for the primary cell is the same as the first UL reference UL-DL configuration for the secondary cell, the UL-DL configuration refers to the first UL reference UL-DL configuration.

In FIG. 14, in a case where one primary cell and one secondary cell are configured and the first UL reference UL-DL configuration for the primary cell is different from the first UL reference UL-DL configuration for the secondary cell, the UL-DL configuration refers to the second UL reference UL-DL configuration.

In a case where transmission of the PUSCH is scheduled in a subframe n, the terminal device 1 determines PHICH resources in a subframe (n+k) specified from the table in FIG. 14.

For example, in a case where a transmission of the PUSCH is scheduled for a serving cell in which the UL-DL configuration 0 is set, in [SFN=m, subframe n=2], a PHICH resource is determined in [SFN=m, subframe n=6].

The DL reference UL-DL configuration will be described below in detail.

The DL reference UL-DL configuration is used for specifying (selecting, determining) a correspondence between a subframe n in which a PDSCH is allocated, and a subframe (n+k) in which HARQ-ACK in response to the PDSCH is transmitted.

In a plurality of serving cells is configured, in each of the plurality of serving cells, the corresponding DL reference UL-DL configuration is used for specifying (selecting, determining) a correspondence between a subframe n in which a PDSCH is allocated, and a subframe (n+k) in which HARQ-ACK in response to the PDSCH is transmitted.

Figures 15, 16, 17:
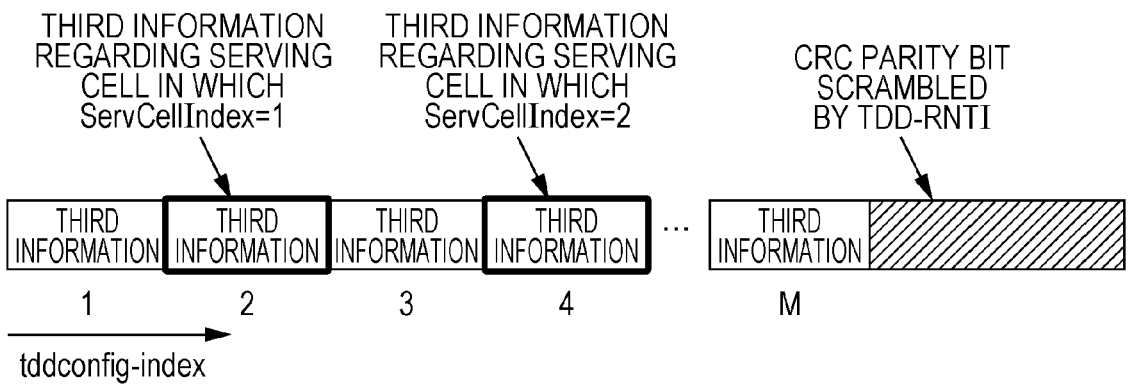
FIG. 15 is a diagram illustrating a correspondence between a subframe (n−k) in which a PDSCH is allocated, and a subframe n in which HARQ-ACK corresponding to the PDSCH is transmitted, in the embodiment.
FIG. 16 is a diagram illustrating an example of a configuration for a correspondence between ServCellIndex and an index of third information, in the embodiment.
FIG. 17 is a diagram illustrating an example of DCI format 5 including the third information in the embodiment.

FIG. 15 is a diagram illustrating a correspondence between a subframe n in which a PDSCH is allocated, and a subframe (n−k) in which HARQ-ACK in response to the PDSCH is transmitted. The terminal device 1 specifies (selects, determines) the value of k in accordance with the table in FIG. 15.

The DL reference UL-DL configuration is simply referred to as an UL-DL configuration in the following descriptions for FIG. 15.

In FIG. 15, in a case where one primary cell is configured, or in a case where one primary cell and one secondary cell are configured and the first DL reference UL-DL configuration for the primary cell is the same as the first DL reference UL-DL configuration for the secondary cell, the UL-DL configuration refers to the first DL reference UL-DL configuration.

In FIG. 15, in a case where one primary cell and one secondary cell are configured and the first DL reference UL-DL configuration for the primary cell is different from the first DL reference UL-DL configuration for the secondary cell, the UL-DL configuration refers to the second DL reference UL-DL configuration.

In a case where PDSCH transmission which is caused to the terminal device 1 to set as a target, and is required to transmit the corresponding HARQ-ACK is detected in a subframe (n−k) (k is specified by the table in FIG. 15) of a serving cell, the terminal device 1 transmits HARQ-ACK in a subframe n.

For example, the terminal device 1 transmits HARQ-ACK in a subframe n (n=2), in response to the PDSCH which has been received in a subframe (n−6) and/or (n−7) in a serving cell in which the UL-DL configuration 1 is set.

The first DL reference UL-DL configuration may not be defined for a serving cell which does not receive second information. In this case, the terminal device 1 and the base station apparatus 3 may perform processing which is performed based on the above-described first DL reference UL-DL configuration, based on the first UL reference UL-DL configuration (UL-DL configuration for a serving cell). The serving cell which does not receive second information corresponds to a serving cell in which dynamic TDD is not configured.

For example, in a case where one primary cell and one secondary cell are configured, not second information for the primary cell but second information for the secondary cell is received, the first UL reference UL-DL configuration for the primary cell (UL-DL configuration for the serving cell) is different from the first DL reference UL-DL configuration for the secondary cell, and the serving cell is the secondary cell, a second DL reference UL-DL configuration for the serving cell (secondary cell) may be set based on a pair formed by the first UL reference UL-DL configuration for another serving cell (primary cell), and the first DL reference UL-DL configuration for the serving cell (secondary cell).

For example, in a case where one primary cell and one secondary cell are configured, not second information for the primary cell but second information for the secondary cell is received, and the first UL reference UL-DL configuration for the primary cell (UL-DL configuration for the serving cell) is different from the first DL reference UL-DL configuration for the secondary cell, in each of two serving cells, the corresponding second DL reference UL-DL configuration may be used for specifying (selecting, determining) a correspondence between a subframe n in which the PDSCH is allocated, and a subframe (n+k) in which HARQ-ACK in response to the PDSCH is transmitted.

For example, in a case where one primary cell and one secondary cell are configured, not second information for the primary cell but second information for the secondary cell is received, and the first UL reference UL-DL configuration for the primary cell (UL-DL configuration for the serving cell) is the same as the first DL reference UL-DL configuration for the secondary cell, in the primary cell, the corresponding first UL reference UL-DL configuration (UL-DL configuration for the serving cell) may be used for specifying (selecting, determining) a correspondence between a subframe n in which the PDSCH is allocated, and a subframe (n+k) in which HARQ-ACK in response to the PDSCH is transmitted. In addition, in the secondary cell, the corresponding first DL reference UL-DL configuration may be used for specifying (selecting, determining) a correspondence between a subframe n in which the PDSCH is allocated, and a subframe (n+k) in which HARQ-ACK in response to the PDSCH is transmitted.

For example, in a case where one primary cell and one secondary cell are configured, not second information for the primary cell but second information for the secondary cell is received, and the first UL reference UL-DL configuration for the primary cell (UL-DL configuration for the serving cell) is the different from the first DL reference UL-DL configuration for the secondary cell, in the primary cell, in FIGS. 10 and 12, the UL-DL configuration for the primary cell refers to the first UL reference UL-DL configuration for the primary cell.

A setting method of the transmission direction UL-DL configuration will be described below.

The DCI format 5 is used for transmitting at least one piece of third information which indicates the transmission direction UL-DL configuration. The DCI format 5 may be used for transmitting plural pieces of third information to each of a plurality of terminal devices. The DCI format 5 may be used for transmitting plural pieces of third information to each of a plurality of cells.

The base station apparatus 3 transmits a signal of a higher layer to the terminal device 1. The signal of a higher layer includes information indicating the value of the TDD-RNTI, and information indicating a parameter (tddconfig-index) corresponding to ServCellIndex.

ServCellIndexx indicates an index of a serving cell. ServCellIndex of a primary cell is 0. ServCellIndex of a secondary cell is controlled through a network, and is selected from 1 to 7. As ServCellIndex, the individual number is assigned to a terminal device. That is, a certain cell may correspond to different ServCellIndex for each of a plurality of terminal devices.

The terminal device 1 specifies third information for the terminal device 1 based on the parameter (tddconfig-index) which is given by a higher layer. The third information is included in the DCI format 5 having an added CRC parity bit which is scrambled by the TDD-RNTI given by the higher layer.

FIG. 16 is a diagram illustrating an example of a configuration of a correspondence between ServCellIndex and an index of the third information in the embodiment. In FIG. 16, "1000000000000000" is configured as the value of the TDD-RNTI, for a terminal device 1A and a terminal device 1B. In FIG. 16, ServCellIndex 0 and tdd config-index 2 correspond to each other for the terminal device 1A.

FIG. 17 is a diagram illustrating an example of the DCI format 5 including third information in the embodiment. In FIG. 17, the DCI format 5 includes third information corresponding to each of tddconfig-indices from tddconfig-index 1 to tddconfig-index M. In FIG. 17, the terminal device 1B determines that third information of tddconfig-index 2 corresponds to a serving cell (secondary cell) of SerCellIndex 1. In FIG. 17, the terminal device 1A determines that third information of tddconfig-index 4 corresponds to a serving cell (secondary cell) of SerCellIndex 2.

The base station apparatus 3 may transmit information to the terminal device 1 by using a signal of the higher layer. The above information indicates a configuration index I relating to a configuration of monitoring of the DCI format 5 by the terminal device 1. The terminal device 1 may determine a subframe in which the DCI format 5 is monitored, based on information relating to a configuration of monitoring of the DCI format 5 by the terminal device 1.

In a certain terminal device 1, the configuration index I is common between a plurality of serving cells.

The configuration index I corresponds to at least periodicity T and an offset k ($0 \leq k < T$). The terminal device 1 sets a configuration index corresponding to the periodicity T and the offset k, based on a signal of the higher layer. The base station apparatus 3 may transmit the signal of the higher layer to the terminal device 1. That is, the terminal device 1 may receive information regarding the configuration index, by using the signal of the higher layer, and may set the configuration index.

For example, the periodicity T may be selected from $\{10, 20, 40, 80\}$ ms. For example, the offset k may be equal to or more than 0 and be less than the periodicity T.

The terminal device 1 monitors the DCI format 5 including third information which corresponds to each of at least one serving cell, in a subframe in which $(10 \cdot n_f + n - k) \mod T = 0$ is satisfied. $n_f = \{0, 1, \ldots, 1023\}$ is a radio frame index (System Frame Number: SFN). $n = \{0, 1, \ldots, 9\}$ is a subframe index in a radio frame.

In a case where the DCI format 5 is detected between subframes (subframes #m) from a subframe in which $(10 \cdot n_f + n) = [m \cdot T + 1] \mod 10240$ is satisfied, to a subframe in which $(10 \cdot n_f + n) = [(m+1) \cdot T] \mod 10240$ is satisfied, a valid duration of the transmission direction UL-DL configuration indicated by the third information which is included in the DCI format 5 corresponds to subframes (valid duration #m) from a subframe in which $(10 \cdot n_f + n) = [(m+1) \cdot T] \mod 10240$ is satisfied, to a subframe in which $(10 \cdot n_f + n) = [(m+2) \cdot T - 1] \mod 10240$ is satisfied. m is an integer. The terminal device 1 considers that the transmission direction UL-DL configuration indicated by the third information is valid in the valid duration.

In a case where a plurality of offsets k is set, the terminal device 1 may monitor the DCI format 5 in a plurality of subframes among subframes #m $\{m \cdot T, m \cdot T + 1, (m+1) \cdot T - 1\}$.

In a case where the DCI format 5 is detected in a plurality of subframes among subframes #m $\{m \cdot T, m \cdot T + 1, (m+1) \cdot T - 1\}$, the terminal device 1 may set the transmission direction UL-DL configuration based on the third information included in the DCI format 5 which is detected the last in the subframes #m $\{m \cdot T, m \cdot T + 1, \ldots, (m+1) \cdot T - 1\}$.

In a case where the offset k includes a plurality of values, the terminal device 1 may not expect reception of a plurality of DCI formats 5 or a plurality of DCI formats 5 corresponding to the same cell, in the subframes #m $\{m \cdot T, m \cdot T + 1, (m+1) \cdot T - 1\}$. That is, in a case where the offset k includes a plurality of values, and the DCI format 5 is detected in one subframe among the subframes #m $\{m \cdot T, m \cdot T + 1, (m+1) \cdot T - 1\}$, the terminal device 1 may not monitor the DCI format 5 in the remaining subframe corresponding to the offset k. The terminal device 1 may not expect reception of a plurality of DCI formats 5 for a certain serving cell, in the subframes #m $\{m \cdot T, m \cdot T + 1, (m+1) \cdot T - 1\}$. The plurality of DCI formats 5 includes pieces of third information having different values (that is, pieces of third information indicating different transmission direction UL-DL configurations).

FIG. 18 is a diagram illustrating an example of a configuration index for monitoring the DCI format 5 which includes third information, in the embodiment. In FIG. 18, in a case where the configuration index I is 0, the periodicity T is 10 ms, and the offset k is $\{0\}$.

The offset k may be configured based on a bit map.

Figure 19:
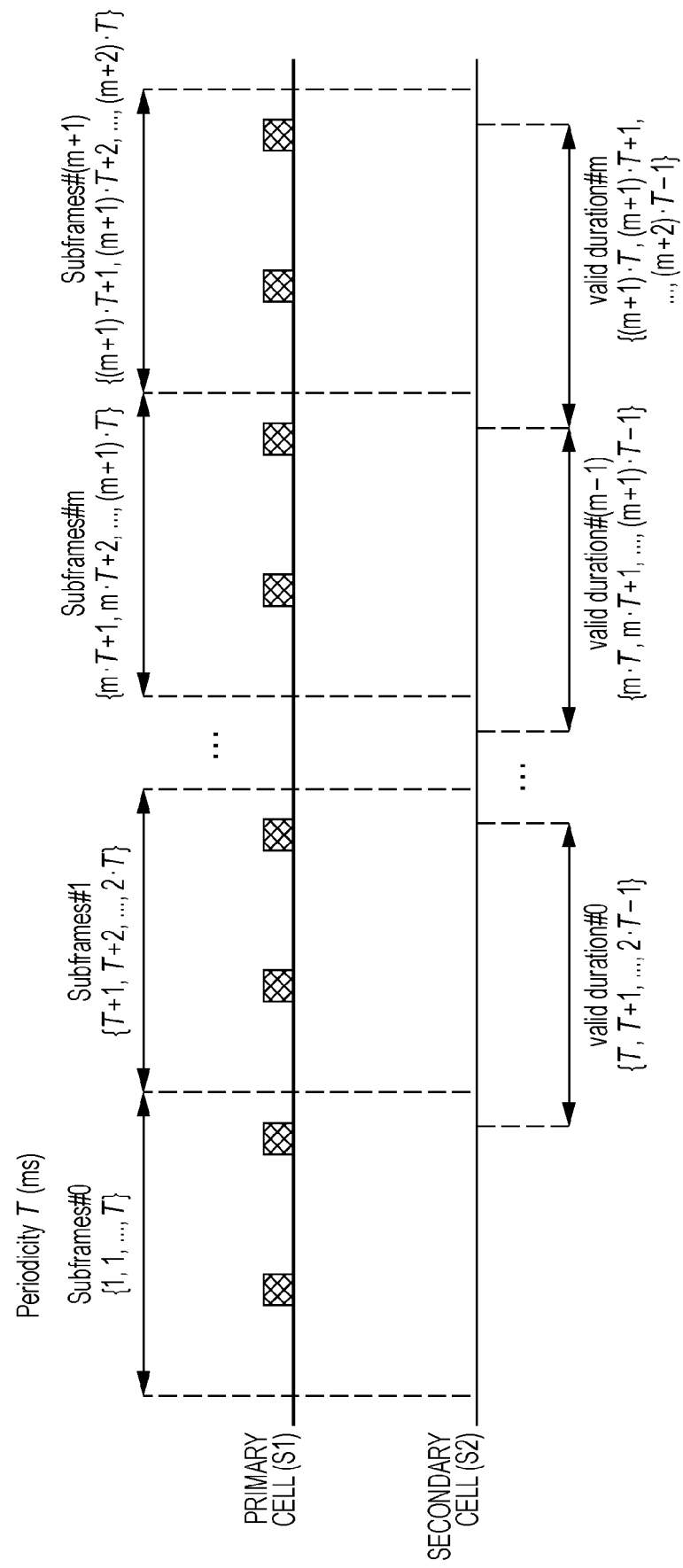
FIG. 19 is a diagram illustrating an example of periodicity T and an offset k in the embodiment.

FIG. 19 is a diagram illustrating an example of the periodicity T and the offset k in the embodiment.

In FIG. 19, one primary cell (S1) and one secondary cell (S2) are configured for the terminal device 1. In FIG. 19, S10 indicates third information transmitted in a CSS of the primary cell (S1) in a subframe in which $(10 \cdot n_f + n - k) \mod T = 0$ is satisfied.

In FIG. 19, the transmission direction UL-DL configuration indicated by third information for the primary cell (S1), which is included in the DCI format 5 detected in a certain subframe #m {m·T+1, m·T+2, . . . , (m+1)·T}, is valid in the valid duration #m {m·T, m·T+1, . . . , (m+1)·T−1}.

In FIG. 19, the transmission direction UL-DL configuration indicated by third information for the secondary cell (S2), which is included in the DCI format 5 detected in a certain subframe #m {m·T+1, m·T+2, . . . , (m+1)·T}, is valid in the valid duration #m {m·T, m·T+1, . . . , (m+1)·T−1}.

That is, the transmission direction UL-DL configuration which is included in the same DCI format 5, and is indicated by third information for each of a plurality of serving cells is valid during the same duration.

The transmission direction UL-DL configuration will be described below.

The terminal device 1 and the base station apparatus 3 sets the transmission direction UL-DL configuration relating to a direction (up/down) of transmission in a subframe. The transmission direction UL-DL configuration is used for determining a direction of transmission in a subframe in the corresponding serving cell.

The terminal device 1 may control transmission in a first flexible subframe and a second flexible subframe, based on scheduling information (DCI format and/or HARQ-ACK), and the transmission direction UL-DL configuration.

The base station apparatus 3 transmits third information indicating the transmission direction UL-DL configuration to the terminal device 1. The third information is information for an instruction of a subframe in which uplink transmission is allowable. The third information is information for an instruction of a subframe in which downlink transmission is allowable. The third information is information for an instruction of a subframe in which CSI measurement (interference measurement) for a downlink is possible. The third information is information for an instruction of a subframe in which uplink transmission in the UpPTS, and downlink transmission in the DwPTS are allowable. The transmission direction UL-DL configuration is used for specifying the direction of transmission in a subframe of an instruction as a different subframe between the first UL reference UL-DL configuration and the first DL reference UL-DL configuration is performed.

The base station apparatus 3 may perform scheduling of transmission of a downlink in a subframe of which an instruction as a downlink subframe is performed by the transmission direction UL-DL configuration.

In a case where the third information (DCI format 5) may be detected so as to be valid, the terminal device 1 may perform reception processing of a downlink signal in a subframe of which an instruction as a downlink subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 may perform reception processing of a downlink signal in a subframe of which an instruction as a downlink subframe is performed by the UL reference UL-DL configuration, among the valid durations #m {m·T, m·T+1, . . . , (m+1)·T−1}.

In a case where detection of the third information (DCI format 5) corresponding to the valid durations #m {m·T, m·T+1, . . . , (m+1)·T−1} to be valid is not possible, the terminal device 1 may perform reception processing of a downlink signal in a subframe of which an instruction as a downlink subframe is performed by the DL reference UL-DL configuration, among the valid durations #m {m·T, m·T+1, . . . , (m+1)·T−1}.

The base station apparatus 3 may transmit a first PDCCH in a subframe of which an instruction as a downlink subframe is performed by the transmission direction UL-DL configuration.

In a case where the third information (DCI format 5) may be detected so as to be valid, the terminal device 1 may monitor the first PDCCH having attached downlink assignment and/or uplink grant, in a subframe of which an instruction as a downlink subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 may monitor the first PDCCH having attached downlink assignment and/or uplink grant, in a subframe of which an instruction as a downlink subframe is performed by the UL reference UL-DL configuration, among the valid durations #m {m·T, m·T+1, . . . , (m+1)·T−1}.

In a case where detection of the third information (DCI format 5) corresponding to the valid durations #m {m·T, m·T+1, . . . , (m+1)·T−1} to be valid is not possible, the terminal device 1 may monitor the first PDCCH having attached downlink assignment and/or uplink grant, in a subframe of which an instruction as a downlink subframe is performed by the DL reference UL-DL configuration, among the valid durations #m {m·T, m·T+1, . . . , (m+1)·T−1}.

The base station apparatus 3 does not perform scheduling of transmission of an uplink in a subframe of which an instruction as a downlink subframe is performed by the transmission direction UL-DL configuration.

In a case where the third information (DCI format 5) may be detected so as to be valid, the terminal device 1 does not transmit the uplink, for example, even when the transmission of the uplink is scheduled, in a subframe of which an instruction as a downlink subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 does not transmit the uplink, for example, even when the transmission of the uplink is scheduled, in a subframe of which an instruction as a downlink subframe is performed by the UL reference UL-DL configuration, among the valid durations #m {m·T, m·T+1, . . . , (m+1)·T−1}.

In a case where detection of the third information (DCI format 5) corresponding to the valid durations #m {m·T, m·T+1, . . . , (m+1)·T−1} to be valid is not possible, the terminal device 1 does not transmit the uplink, for example, even when the transmission of the uplink is scheduled, in a subframe of which an instruction as a downlink subframe is performed by the DL reference UL-DL configuration, among the valid durations #m {m·T, m·T+1, . . . , (m+1)·T−1}.

The base station apparatus 3 may perform scheduling of transmission of an uplink in a subframe of which an instruction as an uplink subframe is performed by the transmission direction UL-DL configuration.

In a case where the third information (DCI format 5) may be detected so as to be valid, the terminal device 1 may perform transmission processing of an uplink signal, in a subframe of which an instruction as an uplink subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 may perform transmission processing of an uplink signal, in a subframe of which an instruction as an uplink subframe is performed by the UL reference UL-DL configuration, among the valid durations #m {m·T, m·T+1, . . . , (m+1)·T—1}.

In a case where detection of the third information (DCI format 5) corresponding to the valid durations #m {m·T, m·T+1, . . . , (m+1)·T−1} to be valid is not possible, the terminal device 1 may perform transmission processing of an uplink signal, in a subframe of which an instruction as an uplink subframe is performed by the DL reference UL-DL configuration, among the valid durations #m {m·T, m·T+1, . . . , (m+1)·T−1}.

The terminal device 1 may not monitor the first PDCCH having attached downlink assignment and/or an uplink grant, in a subframe of which an instruction as an uplink subframe is performed by the transmission direction UL-DL configuration.

In a case where the third information (DCI format 5) may be detected so as to be valid, the terminal device 1 may not monitor the first PDCCH having attached downlink assignment and/or an uplink grant, in a subframe of which an instruction as an uplink subframe is performed by the transmission direction UL-DL configuration indicated by the detected third information, among valid durations #m {m·T, m·T+1, . . . , (m+1)·T−1} corresponding to the detected third information.

The base station apparatus 3 may perform scheduling of transmission of a downlink in the DwPTS of a subframe of which an instruction as a special subframe is performed by the transmission direction UL-DL configuration.

In a case where the third information (DCI format 5) may be detected so as to be valid, the terminal device 1 may perform reception processing of a downlink signal in the DwPTS of a subframe of which an instruction as a special subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 may perform reception processing of a downlink signal, in the DwPTS of a subframe of which an instruction as a special subframe is performed by the UL reference UL-DL configuration, among the valid durations #m {m·T, m·T+1, . . . , (m+1)·T−1}.

In a case where detection of the third information (DCI format 5) corresponding to the valid durations #m {m·T, m·T+1, . . . , (m+1)·T−1} to be valid is not possible, the terminal device 1 may perform reception processing of a downlink signal, in the DwPTS of a subframe of which an instruction as a special subframe is performed by the DL reference UL-DL configuration, among the valid durations #m {m·T, m·T+1, . . . , (m+1)·T−1}.

The base station apparatus 3 may transmit the first PDCCH in a subframe of which an instruction as a special subframe is performed by the transmission direction UL-DL configuration.

In a case where the third information (DCI format 5) may be detected so as to be valid, the terminal device 1 may monitor the first PDCCH having attached downlink assignment and/or an uplink grant, in a subframe of which an instruction as a special subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 may monitor the first PDCCH having attached downlink assignment and/or an uplink grant, in a subframe of which an instruction as a special subframe is performed by the UL reference UL-DL configuration, among the valid durations #m {m·T, m·T+1, . . . , (m+1)·T−1}.

In a case where detection of the third information (DCI format 5) corresponding to the valid durations #m {m·T, m·T+1, . . . , (m+1)·T−1} to be valid is not possible, the terminal device 1 may monitor the first PDCCH having attached downlink assignment and/or an uplink grant, in a subframe of which an instruction as a special subframe is performed by the DL reference UL-DL configuration, among the valid durations #m {m·T, m·T+1, . . . , (m+1)·T−1}.

The base station apparatus 3 may perform scheduling of transmission of an SRS in the UpPTS of a subframe of which an instruction as a special subframe is performed by the transmission direction UL-DL configuration.

In a case where the third information (DCI format 5) may be detected so as to be valid, the terminal device 1 may perform transmission processing of the SRS, in the UpPTS of a subframe of which an instruction as a special subframe is performed by the transmission direction UL-DL configuration indicated by the detected third information, among valid durations #m {m·T, m·T+1, . . . , (m+1)·T−1} corresponding to the detected third information.

In a case where detection of the third information (DCI format 5) corresponding to the valid durations #m {m·T, m·T+1, . . . , (m+1)·T−1} to be valid is not possible, the terminal device 1 may perform transmission processing of the SRS, in the UpPTS of a subframe of which an instruction as a special subframe is performed by the UL reference UL-DL configuration, among the valid durations #m {m·T, m·T+1, . . . , (m+1)·T−1}.

In a case where detection of the third information (DCI format 5) corresponding to the valid durations #m {m·T, m·T+1, . . . , (m+1)·T−1} to be valid is not possible, the terminal device 1 may perform transmission processing of the SRS, in the UpPTS of a subframe of which an instruction as a special subframe is performed by the DL reference UL-DL configuration, among the valid durations #m {m·T, m·T+1, (m+1)·T−1}.

Activation and deactivation of a cell in the embodiment will be described below.

The network may transmit an activated/deactivated Medium Access Control (MAC) Control Element (CE), and thus cause a configured secondary cell to be activated or deactivated. Further, a terminal device holds sCellDeactivationTimer for each of configured secondary cells, and deactivates the associated secondary cell when the sCellDeactivationTimer expires. The primary cell is normally activated.

In a case where a serving cell is deactivated, the terminal device 1 does not monitor the first PDCCH in the deactivated serving cell. In a case where a serving cell is deactivated, the terminal device 1 does not monitor the first PDCCH for the deactivated serving cell.

In a case where a serving cell is activated, the terminal device 1 monitors the first PDCCH in the activated serving cell. In a case where a serving cell is activated, the terminal device 1 monitors the first PDCCH for the activated serving cell.

The terminal device 1 may monitor the first PDCCH in a CSS and an USS in the primary cell which are normally activated.

That is, in a case where the secondary cell configured so as to cause the terminal device 1 to monitor the first PDCCH is activated, the terminal device 1 monitors the first PDCCH in an USS in the activated secondary cell.

That is, in a case where the secondary cell is activated, and a serving cell configured so as to cause the terminal device 1 to monitor the first PDCCH corresponding to the activated secondary cell is activated, the terminal device 1 may monitor the first PDCCH for the activated secondary cell, in the USS in the activated secondary cell.

That is, in a case where a serving cell is activated, the terminal device 1 may monitor the first PDCCH in the activated serving cell in a subframe of which an instruction as a downlink subframe and a special subframe is performed by the transmission direction UL-DL configuration, for the activated serving cell.

That is, in a case where a serving cell is activated, the terminal device 1 may monitor the first PDCCH for the activated serving cell, in the activated serving cell in a subframe of which an instruction as a downlink subframe and a special subframe is performed by the transmission direction UL-DL configuration, for the activated serving cell.

That is, in a case where the secondary cell configured so as to cause the terminal device 1 to monitor the first PDCCH is activated, the terminal device 1 may monitor the first PDCCH in an USS of the activated secondary cell in a subframe of which an instruction as a downlink subframe and a special subframe is performed by the transmission direction UL-DL configuration, for the activated secondary cell.

That is, in a case where the secondary cell is activated, and an instruction of a certain subframe as a downlink subframe or a special subframe is performed by the transmission direction UL-DL configuration for the activated secondary cell, the terminal device 1 may monitor the first PDCCH for the activated secondary cell, in the subframe.

The terminal device 1 may not monitor the first PDCCH in the serving cell in a subframe of which an instruction as an uplink subframe is performed by the transmission direction UL-DL configuration for the serving cell.

In a case where an instruction of a certain subframe as an uplink subframe is performed by the transmission direction UL-DL configuration for a serving cell, the terminal device 1 may not monitor the first PDCCH for the serving cell, in the subframe.

That is, in a case where the secondary cell is activated, a serving cell configured so as to cause the terminal device 1 to monitor the first PDCCH corresponding to the activated secondary cell is activated, and an instruction of a certain subframe as a downlink subframe or a special subframe is performed by the transmission direction UL-DL configuration for the activated secondary cell, the terminal device 1 may monitor the first PDCCH for the activated secondary cell, in an USS of the activated serving cell in the subframe. In this case, if an instruction of the subframe as an uplink subframe by the transmission direction UL-DL configuration for the activated serving cell is performed, the terminal device 1 may not monitor the first PDCCH for the activated secondary cell, in the USS of the activated serving cell in the subframe.

In a case where the secondary cell is activated, a serving cell configured so as to cause the terminal device 1 to monitor the first PDCCH corresponding to the activated secondary cell is activated, if the valid transmission direction UL-DL configuration for the activated secondary cell is not set, the terminal device 1 may monitor the first PDCCH for the activated secondary cell, in the USS of the activated secondary cell in a subframe of which an instruction as a downlink subframe and a special subframe is performed by the UL reference UL-DL configuration for the activated secondary cell.

In a case where the secondary cell is activated, a serving cell configured so as to cause the terminal device 1 to monitor the first PDCCH corresponding to the activated secondary cell is activated, if the valid transmission direction UL-DL configuration for the activated secondary cell is not set, the terminal device 1 may monitor the first PDCCH for the activated secondary cell, in the USS of the activated secondary cell in a subframe of which an instruction as a downlink subframe and a special subframe is performed by the DL reference UL-DL configuration for the activated secondary cell.

That is, in a case where the secondary cell is activated, a serving cell configured so as to cause the terminal device 1 to monitor the first PDCCH corresponding to the activated secondary cell is activated, and an instruction of a certain subframe as a downlink subframe or a special subframe is performed by the transmission direction UL-DL configuration for the activated secondary cell, the terminal device 1 may monitor the first PDCCH for the activated secondary cell, in an USS of the activated serving cell in the subframe. In this case, if an instruction of the subframe as an uplink subframe by the transmission direction UL-DL configuration for the activated serving cell is performed, the terminal device 1 may not monitor the first PDCCH for the activated secondary cell, in the USS of the activated serving cell in the subframe. In this case, if an instruction of the subframe as an uplink subframe by the transmission direction UL-DL configuration for the activated serving cell is performed, the first PDCCH for the activated serving cell may be discarded in the USS of the activated serving cell in the subframe.

In a case where the secondary cell is activated, a serving cell configured so as to cause the terminal device 1 to monitor the first PDCCH corresponding to the activated secondary cell is activated, if the valid transmission direction UL-DL configuration for the activated serving cell is not set, the terminal device 1 may monitor the first PDCCH for the activated secondary cell, in the USS of the activated secondary cell in a subframe of which an instruction as a downlink subframe and a special subframe is performed by the UL reference UL-DL configuration for the activated secondary cell.

In a case where the secondary cell is activated, a serving cell configured so as to cause the terminal device 1 to monitor the first PDCCH corresponding to the activated secondary cell is activated, if the valid transmission direction UL-DL configuration for the activated serving cell is not set, the terminal device 1 may monitor the first PDCCH for the activated secondary cell, in the USS of the activated secondary cell in a subframe of which an instruction as a downlink subframe and a special subframe is performed by the DL reference UL-DL configuration for the activated secondary cell.

In a case where the secondary cell is activated, a serving cell configured so as to cause the terminal device 1 to monitor the first PDCCH corresponding to the activated secondary cell is activated, if the activated serving cell is a cell to which the FDD scheme is applied, the terminal device 1 may monitor the first PDCCH for the activated secondary cell, in the USS of the activated secondary cell in all subframes.

In a case where at least one of one or a plurality of serving cells which correspond to the DCI format 5 is activated, the terminal device 1 may monitor a second PDCCH in a CSS in the primary cell.

That is, in a case where at least one of one or a plurality of serving cells which correspond to the DCI format 5 is activated, the terminal device 1 may monitor the second PDCCH in a CSS of the primary cell in a subframe in which $(10 \cdot n_f + n - k) \mod T = 0$ is satisfied.

In a case where one serving cell or all of a plurality of serving cells corresponding to the DCI format 5 are deactivated, the terminal device 1 may not monitor the second PDCCH.

For example, in FIG. 16, in a case where both of the secondary cell of ServCellIndex=1, and the secondary cell of ServCellIndex=2 are deactivated, the terminal device 1B may not monitor the second PDCCH in the CSS of the primary cell in a subframe in which $(10 \cdot n_f + n - k) \mod T = 0$ is satisfied.

For example, in FIG. 16, in a case where either or both of the secondary cell of ServCellIndex=1, and the secondary cell of ServCellIndex=2 are deactivated, the terminal device 1B may monitor the second PDCCH in the CSS of the primary cell in a subframe in which $(10 \cdot n_f + n - k) \mod T = 0$ is satisfied.

A configuration of an apparatus according to the embodiment will be described below.

Figure 20:
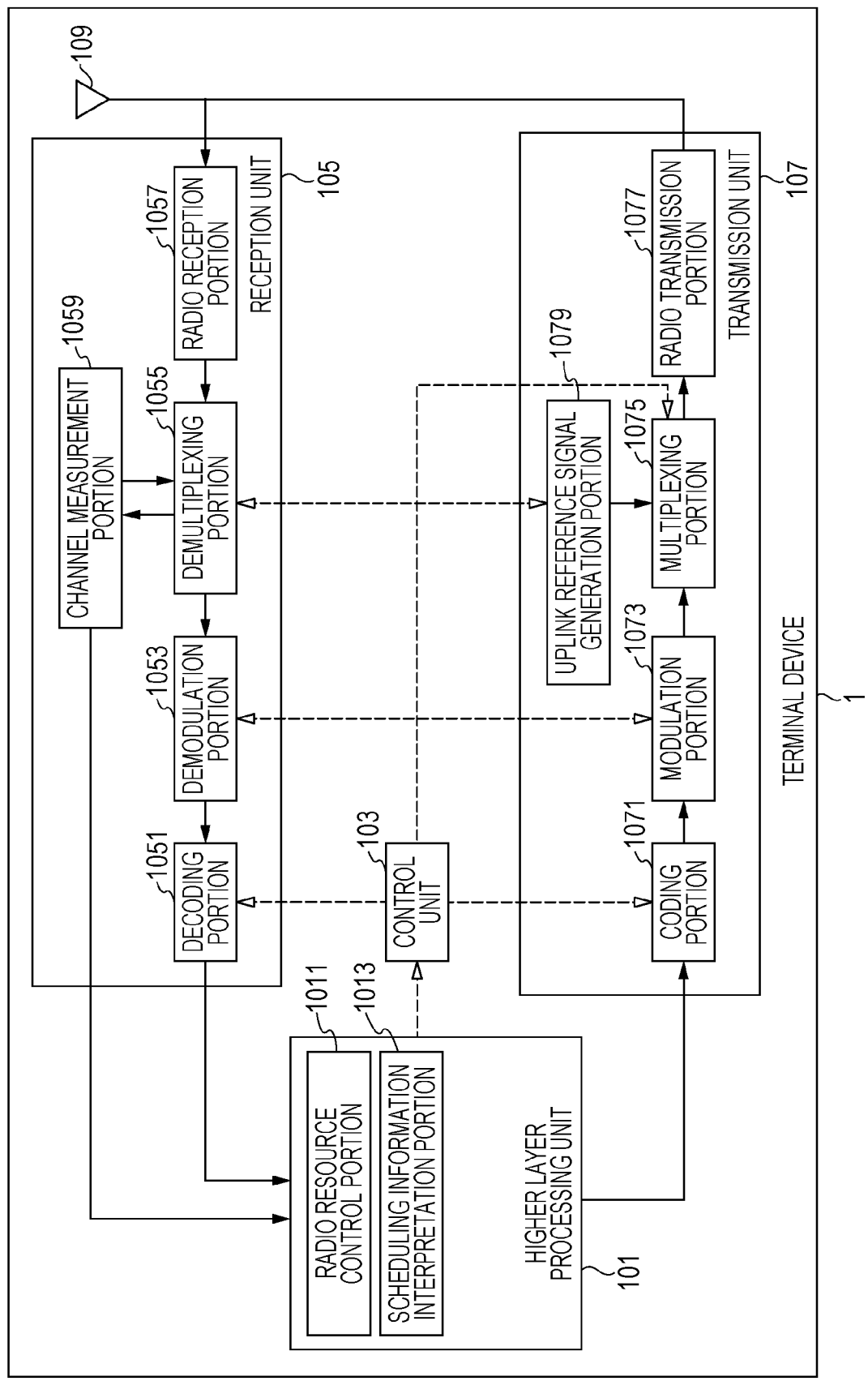
FIG. 20 is a schematic block diagram illustrating a configuration of a terminal device 1 according to the embodiment.

FIG. 20 is a schematic block diagram illustrating a configuration of the terminal device 1 according to the embodiment. As illustrated in FIG. 20, the terminal device 1 includes a higher layer processing unit 101, a control unit 103, a reception unit 105, a transmission unit 107, and a transmit/receive antenna unit 109. The higher layer processing unit 101 includes a radio resource control portion (configuring portion) 1011 and a scheduling information interpretation portion 1013. The reception unit 105 includes a decoding portion 1051, a demodulation portion 1053, a demultiplexing portion 1055, a radio reception portion 1057, and a channel measurement portion 1059. The transmission unit 107 includes a coding portion 1071, a modulation portion 1073, a multiplexing portion 1075, a radio transmission portion 1077, and an uplink reference signal generation portion 1079.

The higher layer processing unit 101 outputs uplink data (transport block) which has been generated by an operation of a user and the like, to the transmission unit 107. The higher layer processing unit 101 performs processing of a medium access control (MAC) layer, a packet data convergence protocol (PDCP) layer, a radio link control (RLC) layer, and a radio resource control (RRC) layer.

The radio resource control portion 1011 included in the higher layer processing unit 101 manages various types of configuration information/parameters of the terminal device 1. The radio resource control portion 1011 sets the various types of configuration information/parameters, based on a signal of a higher layer which has been received from the base station apparatus 3. That is, the radio resource control portion 1011 sets the various types of configuration information/parameters, based on information indicating the various types of configuration information/parameters which has been received from the base station apparatus 3. The radio resource control portion 1011 generates information assigned in each channel of an uplink, and outputs the generated information to the transmission unit 107. The radio resource control portion 1011 is also referred to as a configuring portion 1011.

The scheduling information interpretation portion 1013 included in the higher layer processing unit 101 analyzes the DCI format (scheduling information) which has been received through the reception unit 105. The scheduling information interpretation portion 1013 generates control information for controlling the reception unit 105 and the transmission unit 107, based on a result obtained by analyzing the DCI format. The scheduling information interpretation portion 1013 outputs the generated control information to the control unit 103.

The control unit 103 generates a control signal for controlling the reception unit 105 and the transmission unit 107, based on the control information from the higher layer processing unit 101. The control unit 103 outputs the generated control signal to the reception unit 105 and the transmission unit 107, so as to control the reception unit 105 and the transmission unit 107.

The reception unit 105 performs demultiplexing, demodulation, and decoding of a reception signal which has been received from the base station apparatus 3 through the transmit/receive antenna unit 109, in accordance with the control signal input from the control unit 103. The reception unit 105 outputs the decoded information to the higher layer processing unit 101.

The radio reception portion 1057 converts (down-converts) a downlink signal received through the transmit/receive antenna unit 109, into a baseband signal by orthogonal demodulation. The radio reception portion 1057 removes unnecessary frequency components, controls an amplification level so as to appropriately maintain a signal level. The radio reception portion 1057 performs orthogonal demodulation, based on the same phase component and an orthogonal component of the received signal. The radio reception portion 1057 converts an analog signal obtained by orthogonal demodulation into a digital signal. The radio reception portion 1057 removes a component corresponding to a cyclic prefix (CP), from the converted digital signal. The radio reception portion 1057 performs Fast Fourier Transform (FFT) on a signal obtained by removing the CP, and thus extracts a signal of the frequency domain.

The demultiplexing portion 1055 performs demultiplexing of the extracted signal into a PHICH, a PDCCH, an EPDCCH, a PDSCH, and a downlink reference signal. The demultiplexing portion 1055 performs channel compensation for the PHICH, the PDCCH, the EPDCCH, and the PDSCH, from an estimated value of the channel input from the channel measurement portion 1059. The demultiplexing portion 1055 outputs the demultiplexed downlink reference signal to the channel measurement portion 1059.

The demodulation portion 1053 performs combining by multiplying codes corresponding to the PHICH, and demodulates the combined signal by using the binary phase shift keying (BPSK) modulation scheme. The demodulation portion 1053 outputs a signal obtained by demodulation, to the decoding portion 1051. The decoding portion 1051 decodes the PHICH for the terminal device, and outputs a HARQ indicator obtained by decoding, to the higher layer processing unit 101. The demodulation portion 1053 demodulates the PDCCH and/or the EPDCCH by using the QPSK modulation scheme, and outputs the demodulated PDCCH and/or the EPDCCH to the decoding portion 1051. In a case where the decoding portion 1051 attempts to decode the PDCCH and/or EPDCCH, and the decoding succeeds, the decoding portion 1051 outputs downlink control information obtained by decoding, and a RNTI corresponding to the downlink control information, to the higher layer processing unit 101.

The demodulation portion 1053 performs demodulation on the PDSCH. The demodulation is performed by using a modulation scheme such as quadrature phase shift keying (QPSK), 16QAM (quadrature amplitude modulation), and 64QAM, of which a notification is performed by using a downlink grant. The demodulation portion 1053 outputs a result obtained by demodulation, to the decoding portion 1051. The decoding portion 1051 performs coding based on information regarding a coding rate of which a notification is performed by using the downlink control information. The decoding portion 1051 outputs downlink data (transport block) obtained by decoding, to the higher layer processing unit 101.

The channel measurement portion 1059 measures a path loss of a downlink or a state of a channel, based on a downlink reference signal input from the demultiplexing portion 1055. The channel measurement portion 1059 outputs the path loss of a downlink or a state of a channel obtained by measurement, to the higher layer processing unit 101. The channel measurement portion 1059 calculates an estimated value of a channel in a downlink, based on the downlink reference signal, and outputs the calculated value to the demultiplexing portion 1055. The channel measurement portion 1059 performs channel measurement and/or interference measurement in order to calculate a CQI.

The transmission unit 107 generates an uplink reference signal, codes and modulates uplink data (transport block) input from the higher layer processing unit 101, performs multiplexing of a PUCCH, a PUSCH, and the generated uplink reference signal, and transmits a result obtained by multiplexing, to the base station apparatus 3 through the transmit/receive antenna unit 109. The above generating, coding, modulating, multiplexing, and transmitting are performed in accordance with the control signal input from the control unit 103.

The coding portion 1071 codes uplink control information input from the higher layer processing unit 101 through convolution coding, block coding, and the like. The coding portion 1071 performs turbo coding based on information used in scheduling of the PUSCH.

The modulation portion 1073 modulates coding bits input from the coding portion 1071 by using a modulation scheme such as BPSK, QPSK, 16QAM, and 64QAM, of which a notification is performed by using the downlink control information, or by using a modulation scheme which is predetermined for each channel. The modulation portion 1073 determines the number of sequences of data which is subjected to spatial multiplexing, based on information used in scheduling of the PUSCH. The modulation portion 1073 maps plural pieces of uplink data which are transmitted on the same PUSCH by using MIMO (Multiple Input Multiple Output) SM (Spatial Multiplexing), on a plurality of sequences. The modulation portion 1073 performs precoding on the mapped sequences.

The uplink reference signal generation portion 1079 generates a sequence obtained by a predetermined rule (expression). The sequence is generated based on a physical layer cell identity (referred to as a PCI, a Cell ID, and the like) for identifying the base station apparatus 3, a bandwidth for mapping the uplink reference signal, a cyclic shift of which a notification is performed by using the uplink grant, the value of a parameter for generating a DMRS sequence, and the like. The multiplexing portion 1075 performs Discrete Fourier Transform (DFT) by arranging modulation symbols of the PUSCH in parallel to each other, in accordance with the control signal input from the control unit 103. The multiplexing portion 1075 performs multiplexing of signals of the PUSCH and the PUCCH and the generated uplink reference signal, for each transmission antenna port. That is, the multiplexing portion 1075 maps the signals of the PUCCH and the PUSCH and the generated uplink reference signal on resource elements for each transmission antenna port.

The radio transmission portion 1077 performs Inverse Fast Fourier Transform (IFFT) on the multiplexed signal, so as to generate a SC-FDMA symbol. The radio transmission portion 1077 adds the generated SC-FDMA symbol to a CP, generates a baseband digital signal, and converts the generated baseband digital signal into an analog signal. The radio transmission portion 1077 removes the extra frequency component by using a low pass filter, performs up-conversion into a signal having a carrier frequency. The radio transmission portion 1077 performs power amplification, and outputs and transmits a signal obtained by power amplification, to the transmit/receive antenna unit 109.

Figure 21:
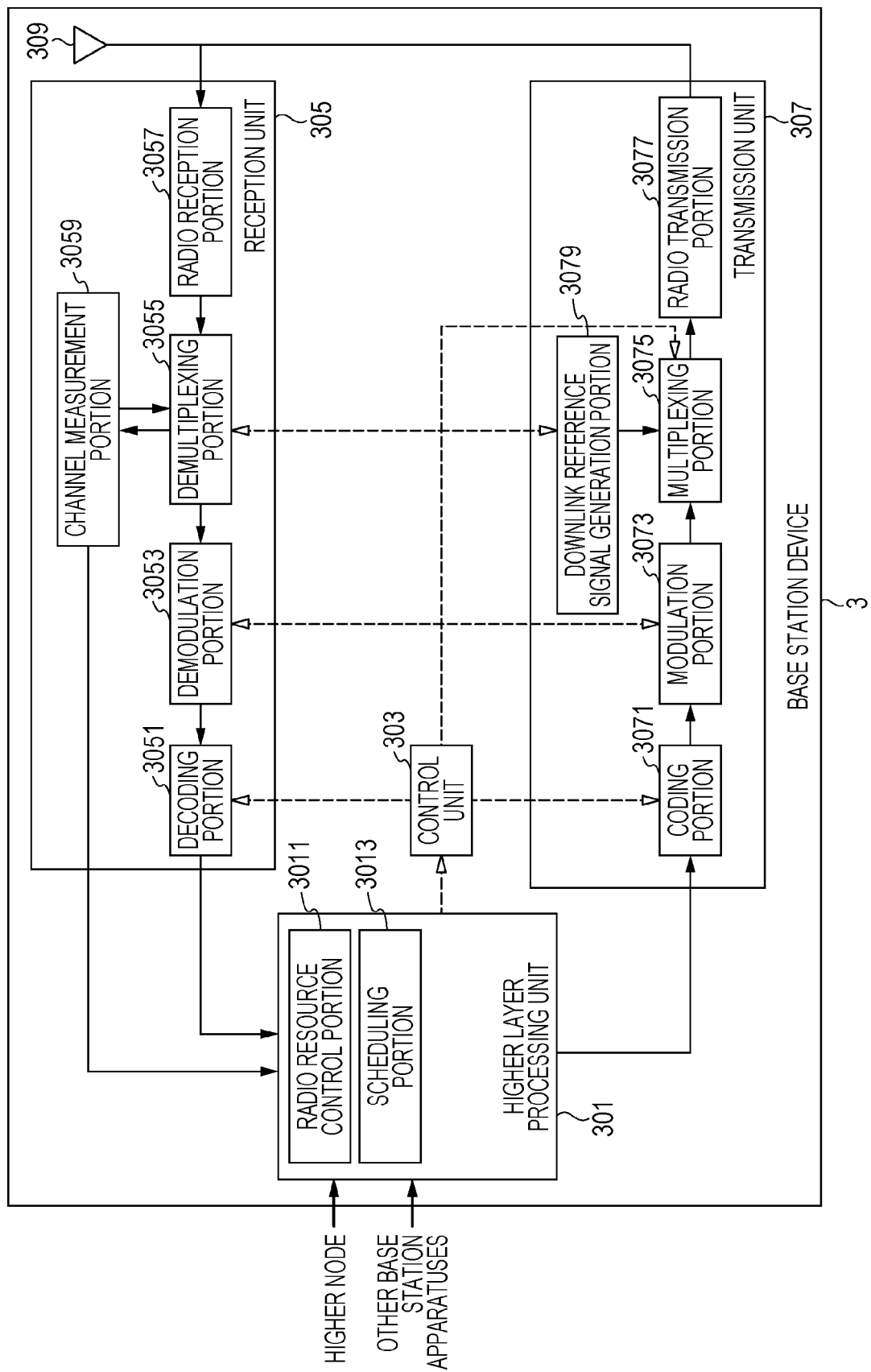
FIG. 21 is a schematic block diagram illustrating a configuration of a base station apparatus 3 according to the embodiment.

FIG. 21 is a schematic block diagram illustrating a configuration of the base station apparatus 3 according to the embodiment. As illustrated in FIG. 21, the base station apparatus 3 includes a higher layer processing unit 301, a control unit 303, a reception unit 305, a transmission unit 307, and a transmit/receive antenna unit 309. The higher layer processing unit 301 includes a radio resource control portion 3011 and a scheduling portion 3013. The reception unit 305 includes a decoding portion 3051, a demodulation portion 3053, a demultiplexing portion 3055, a radio reception portion 3057, and a channel measurement portion 3059. The transmission unit 307 includes a coding portion 3071, a modulation portion 3073, a multiplexing portion 3075, a radio transmission portion 3077, and a downlink reference signal generation portion 3079.

The higher layer processing unit 301 performs processing of a medium access control (MAC) layer, a packet data convergence protocol (PDCP) layer, a radio link control (RLC) layer, and a radio resource control (RRC) layer. The higher layer processing unit 301 generates control information for controlling the reception unit 305 and the transmission unit 307, and outputs the generated control information to the control unit 303.

The radio resource control portion 3011 included in the higher layer processing unit 301 generates or acquires downlink data (transport block), system information, a RRC message, a MAC control element (CE), and the like which are allocated in the PDSCH of a downlink, from a higher node, and performs an output to the transmission unit 307. The radio resource control portion 3011 manages various types of configuration information/parameters of each terminal device 1. The radio resource control portion 3011 may set the various types of configuration information/parameters for each terminal device 1, based on a signal of a higher layer. That is, the radio resource control portion 1011 transmits/broadcasts information indicating the various types of configuration information/parameters. The radio resource control portion 3011 is also referred to as a configuring portion 3011.

The scheduling portion 3013 included in the higher layer processing unit 301 determines a frequency and a subframe for allocating physical channels (PDSCH and PUSCH), a coding rate of the physical channels (PDSCH and PUSCH), a modulation scheme, transmitted power, and the like, based on the received channel state information, the estimated value of a channel input from the channel measurement portion 3059, quality of the channel, and the like. The scheduling portion 3013 generates control information (for example, DCI format) for controlling the reception unit 305 and the transmission unit 307, based on a scheduling result. The scheduling portion 3013 outputs the generated control information to the control unit 303. The scheduling portion 3013 determines timings at which the transmission processing and the reception processing are performed.

The control unit 303 generates a control signal for controlling the reception unit 305 and the transmission unit 307, based on the control information from the higher layer processing unit 301. The control unit 303 outputs the generated control signal to the reception unit 305 and the transmission unit 307, so as to control the reception unit 305 and the transmission unit 307.

The reception unit 305 performs demultiplexing, demodulation, and decoding of a reception signal which has been received from the terminal device 1 through the transmit/receive antenna unit 309, in accordance with the control signal input from the control unit 303. The reception unit 305 outputs the decoded information to the higher layer processing unit 301. The radio reception portion 3057 converts (down-converts) an uplink signal received through the transmit/receive antenna unit 309, into a baseband signal by orthogonal demodulation. The radio reception portion 3057 removes unnecessary frequency components, controls an amplification level so as to appropriately maintain a signal level. The radio reception portion 3057 performs orthogonal demodulation, based on the same phase component and an orthogonal component of the received signal. The radio reception portion 3057 converts an analog signal obtained by orthogonal demodulation into a digital signal.

The radio reception portion 3057 removes a component corresponding to a cyclic prefix (CP), from the converted digital signal. The radio reception portion 3057 performs Fast Fourier Transform (FFT) on a signal obtained by removing the CP, and thus extracts a signal of the frequency domain. The radio reception portion 3057 outputs the extracted signal to the demultiplexing portion 3055.

The demultiplexing portion 1055 performs demultiplexing of the signal input from the radio reception portion 3057, into signals of a PUCCH, a PUSCH, an uplink reference signal, and the like. The demultiplexing is determined in advance by the radio resource control portion 3011 of the base station apparatus 3, and is performed based on allocation information of radio resources, which is included in an uplink grant of which each terminal device 1 is notified. The demultiplexing portion 3055 performs channel compensation for the PUCCH and the PUSCH, from an estimated value of the channel input from the channel measurement portion 3059. The demultiplexing portion 3055 outputs the demultiplexed uplink reference signal to the channel measurement portion 3059.

The demodulation portion 3053 performs Inverse Discrete Fourier Transform (IDFT) on the PUSCH, so as to acquire a modulation symbol. The demodulation portion 3053 demodulates a reception signal for each of modulation symbols of the PUCCH and the PUSCH. The demodulation is performed by using a predetermined modulation scheme such as binary phase shift keying (BPSK), QPSK, 16QAM, and 64QAM, or by using a modulation scheme of which each terminal device 1 is notified in advance with the uplink grant. The demodulation portion 3053 performs demultiplexing of a plurality of modulation symbols of uplink data transmitted on the same PUSCH by using the MIMO SM. The demultiplexing is performed based on the number of sequences of which each terminal device 1 is notified in advance by using the uplink grant, and which are subjected to spatial multiplexing, and information for an instruction of precoding on the sequences.

The decoding portion 3051 decodes coding bits of the demodulated PUCCH and PUSCH, at a coding rate. The coding rate is a predetermined coding rate of a predetermined coding scheme, or a coding rate of which the terminal device 1 is notified with the uplink grant by the base station apparatus 3. The decoding portion 3051 outputs the decoded uplink data and uplink control information to the higher layer processing unit 101. In a case where the PUSCH is retransmitted, the decoding portion 3051 performs decoding by using coding bits which are input from the higher layer processing unit 301 and are held in a HARQ buffer, and demodulated coding bits. The channel measurement portion 309 measures an estimated value of the channel, quality of the channel, and the like, based on the uplink reference signal from the demultiplexing portion 3055. The channel measurement portion 309 outputs a result of the measurement to the demultiplexing portion 3055 and the higher layer processing unit 301.

The transmission unit 307 generates a downlink reference signal, codes and modulates a HARQ indicator, downlink control information, and downlink data input from the higher layer processing unit 301, performs multiplexing of a PHICH, a PDCCH, an EPDCCH, a PDSCH, and the downlink reference signal, and transmits a signal obtained by multiplexing, to the terminal device 1 through the transmit/receive antenna unit 309. The above generating, coding, modulating, multiplexing, and transmitting are performed in accordance with the control signal input from the control unit 303.

The coding portion 3071 codes the HARQ indicator, the downlink control information, and the downlink data input from the higher layer processing unit 301 by using a predetermined coding scheme such as block coding, convolution coding, and turbo coding. In addition, the coding is performed by using a coding scheme determined by the radio resource control portion 3011. The modulation portion 3073 modulates coding bits input from the coding portion 3071, by using a predetermined modulation scheme such as BPSK, QPSK, 16QAM, and 64QAM, or by using a modulation scheme determined by the radio resource control portion 3011.

The downlink reference signal generation portion 3079 generates a sequence which has been known by the terminal device 1 and obtained by a rule predetermined based on a physical layer cell identity (PCI) and the like for identifying the base station apparatus 3, as a downlink reference signal. The multiplexing portion 3075 performs multiplexing of the modulated modulation symbol of each channel and the generated downlink reference signal. That is, the multiplexing portion 3075 maps the modulated modulation symbol of each channel and the generated downlink reference signal on resource elements.

The radio transmission portion 3077 performs Inverse Fast Fourier Transform (IFFT) on the multiplexed modulation symbol and the like, so as to generate an OFDM symbol. The radio transmission portion 3077 adds the generated OFDM symbol to a CP, generates a baseband digital signal, and converts the generated baseband digital signal into an analog signal. The radio transmission portion 3077 removes the extra frequency component by using a low pass filter, performs up-conversion into a signal having a carrier frequency. The radio transmission portion 3077 performs power amplification, and outputs and transmits a signal obtained by power amplification, to the transmit/receive antenna unit 309.

More specifically, the terminal device 1 in the embodiment includes the configuring portion 1011 and the reception unit 105. The configuring portion 1011 sets a plurality of serving cells which are formed by one primary cell and at least one secondary cell. The one primary cell is normally activated. The secondary cell is activated or deactivated in accordance with a network. The reception unit 105 decodes a first PDCCH and a second PDCCH. The first PDCCH has an attached first DCI format (downlink assignment) which is used in scheduling for a single PDSCH in a single serving cell. The second PDCCH has an attached second DCI format (DCI format 5) which includes information (third information) indicating an UL-DL configuration (transmission direction UL-DL configuration) which corresponds to one of a plurality of serving cells or each of the plurality of serving cells. The reception unit 105 decodes the PDSCH based on the first DCI format, in a serving cell which corresponds to the first DCI format among the plurality of serving cells.

The configuring portion 1011 sets an UL-DL configuration (transmission direction UL-DL configuration) for one serving cell which corresponds to the second DCI format among the plurality of serving cells, or each of the plurality of serving cells, based on the second DCI format.

In a case where the secondary cell is deactivated, the reception unit 105 suspends monitoring of the first PDCCH for the deactivated secondary cell.

In a case where the secondary cell is activated, the reception unit 105 monitors the first PDCCH for the activated secondary cell.

In a case where the secondary cell is activated, and a serving cell in which the first PDCCH corresponding to the secondary cell is activated, the reception unit 105 may monitor the first PDCCH for the activated serving cell in a user equipment-specific search space in the activated serving cell.

The reception unit 105 may monitor the first PDCCH for a serving cell corresponding to the UL-DL configuration in a subframe of which an instruction as a downlink subframe and a special subframe is performed by the UL-DL configuration.

The reception unit 105 may monitor the first PDCCH in a serving cell which corresponds to the UL-DL configuration and is activated in a subframe of which an instruction as a downlink subframe and a special subframe is performed by the UL-DL configuration.

In a case where one serving cell or at least one of a plurality of serving cells, which corresponds to the second DCI format is activated, the reception unit 105 monitors the second PDCCH.

The configuring portion 1011 sets a subframe in which the second DCI format is monitored. In a case where one serving cell or at least one of a plurality of serving cells, which corresponds to the second DCI format is activated, the reception unit 105 may monitor the second PDCCH in the subframe which has been set in the primary cell.

The reception unit 105 may monitor the second PDCCH in a common search space in the primary cell.

In a case where one serving cell or all of a plurality of serving cells, which correspond to the second DCI format are deactivated, the reception unit 105 may suspend monitoring of the second PDCCH.

The configuring portion 1015 may set two serving cells formed by one primary cell and at least one secondary cell. The one primary cell is normally activated. The secondary cell is activated or deactivated in accordance with a network. The configuring portion 1015 may set the primary cell as a serving cell in which the first PDCCH having an attached DCI format which is used for scheduling of a single PDSCH in the secondary cell is decoded. The reception unit 105 may decode the first PDCCH and the second PDCCH. The second PDCCH has an attached second DCI format which includes information indicating the UL-DL configuration for the secondary cell. The reception unit 105 may not monitor the first PDCCH in the primary cell in a subframe of which an instruction as an uplink subframe is performed by the UL-DL configuration for the secondary cell.

The configuring portion 1015 may set two serving cells formed by one primary cell and at least one secondary cell. The one primary cell is normally activated. The secondary cell is activated or deactivated in accordance with a network. The configuring portion 1015 may set the primary cell or the secondary cell as a serving cell in which the first PDCCH having an attached DCI format which is used for scheduling of a single PDSCH in the secondary cell is decoded. The reception unit 105 may decode the first PDCCH and the second PDCCH. The second PDCCH has an attached second DCI format which includes information indicating the UL-DL configuration for the primary cell, and information indicating the UL-DL configuration for the secondary cell. In a case where the secondary cell is set as a serving cell in which the first PDCCH having an attached DCI format which is used in scheduling of a single PDSCH in the secondary cell is decoded, the reception unit may not monitor the first PDCCH in a subframe of which an instruction as an uplink subframe is performed by the UL-DL configuration for the secondary cell. In a case where the primary cell is set as a serving cell in which the first PDCCH having an attached DCI format which is used in scheduling of a single PDSCH in the secondary cell is decoded, the reception unit may not monitor the first PDCCH in a subframe of which an instruction as an uplink subframe is performed by either or both of the UL-DL configuration for the primary cell and the UL-DL configuration for the secondary cell.

In a case where the secondary cell is set as a serving cell in which the first PDCCH having an attached DCI format which is used in scheduling of a single PDSCH in the secondary cell is decoded, the reception unit 105 may monitor the first PDCCH in a subframe of which an instruction as a downlink subframe is performed by the UL-DL configuration for the secondary cell. In a case where the primary cell is set as a serving cell in which the first PDCCH having an attached DCI format which is used in scheduling of a single PDSCH in the secondary cell is decoded, the reception unit may monitor the first PDCCH in a subframe of which an instruction as a downlink subframe is performed by either or both of the UL-DL configuration for the primary cell and the UL-DL configuration for the secondary cell. Here, the downlink subframe includes a special subframe.

Thus, it is possible to cause a terminal device to efficiently communicate with a base station apparatus.

A program operated in the base station device 3 and the terminal device 1 according to the present invention is a program (a program for causing a computer to function) for controlling a central processing unit (CPU) and the like so as to implement the functions of the above-described embodiment of the present invention. Information which is handled by the devices is temporarily accumulated in a random access memory (RAM) while processed, and is then stored in various ROMs, such as a Flash read only memory (ROM), or a hard disk drive (HDD). If necessary, information is read, and is modified and written by the CPU.

A portion of the terminal device 1 and the base station device 3 in the above-described embodiment may be implemented by a computer. In this case, a program for implementing the control function may be recorded in a computer-readable recording medium, and the program recorded in the recording medium may be read on a computer system and executed.

The term "computer system" used herein is a computer system which is incorporated in the terminal device 1 or the base station device 3, and includes an OS or hardware, such as peripherals. The term "computer-readable recording medium" refers to a portable medium, such as a flexible disk, a magneto-optical disk, a ROM, or a CD-ROM, or a storage device, such as a hard disk mounted in the computer system.

The term "computer-readable recording medium" may include a medium which holds the program in a short period of time or dynamically, such as a communication line when transmitting the program through a network, such as the Internet, or a communication line, such as a telephone line, and may include a medium which holds the program in a certain period of time, such as a volatile memory inside the computer system to be a server or a client. The program may implement some of the above-described functions or may implement the above-described functions in combination with the program already recorded in the computer system.

The base station device 3 in the above-described embodiment may be implemented as an aggregate (device group) of a plurality of devices. Each device in the device group may include part or all of the functions or the function blocks of the base station device 3 of the above-described embodiment. As the device group, the general functions or functional blocks of the base station device 3 may be provided. The terminal device 1 of the above-described embodiment may communicate with the base station device as an aggregate.

The base station device 3 in the above-described embodiment may be an evolved universal terrestrial radio access network (EUTRAN). The base station device 3 in the above-described embodiment may have some or all of the functions of a higher node to eNodeB.

A portion or the entirety of the terminal device 1 and the base station device 3 of the above-described embodiment may be typically implemented as an LSI, which is an integrated circuit, or may be implemented as a chipset. The functional blocks of the terminal device 1 and the base station device 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the above-described embodiment, a terminal device has been described as an example of a communication device, the application invention is not limited thereto and may be applied to stationary or immovable electronic apparatuses indoors and outdoors, for example, terminal devices, such as an AV system, kitchen equipment, cleaning and washing equipment, air conditioning equipment, office equipment, vending machine, and other living appliances, or communication devices.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

DESCRIPTION OF REFERENCE NUMERALS 1 (1A, 1B, 1C) TERMINAL DEVICE
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL PORTION
1013 SCHEDULING INFORMATION INTERPRETATION PORTION
3011 RADIO RESOURCE CONTROL PORTION
3013 SCHEDULING PORTION

The invention claimed is:

1. A user equipment that is configured to communicate with a base station apparatus by using a plurality of cells, comprising:
reception circuitry configured to and/or programmed to receive first information indicating a radio network temporary identifier (RNTI), second information, third information, fourth information, and fifth information, the second information indicating periodicity T to monitor a physical downlink control channel with cyclic redundant check parity bits scrambled by the RNTI, the third information indicating subframes to monitor the physical downlink control channel in the periodicity T, the fourth information indicating a plurality of uplink-downlink configurations which are transmitted on the physical downlink control channel, and the fifth information indicating an index which is used to determine an uplink-downlink configuration for a serving cell from the plurality of uplink-downlink configurations indicated by the fourth information, and
control circuitry configured to and/or programmed to configure the subframes to monitor the physical downlink control channel based on at least the third information,
wherein
in a case where the fifth information is configured for any of activated serving cells included in the plurality of cells, the reception circuitry is configured to and/or programmed to monitor the physical downlink control channel which includes at least the fourth information, in a common search space for a primary cell, in the configured subframes, in a case where the physical downlink control channel is detected in a radio frame, the uplink-downlink configuration T/10 radio frames in the serving cell is given by the fourth information included in the physical downlink control channel for the serving cell, and the periodicity T is 20 milliseconds, 40 milliseconds, or 80 milliseconds.

2. The user equipment according to claim 1, wherein the uplink-downlink configuration for the T/10 radio frames is used for monitoring the physical downlink control channel.

3. A communication method which is used in a user equipment that is configured to communicate with a base station apparatus by using a plurality of cells, the communication method comprising:

receiving first information indicating a radio network temporary identifier (RNTI), second information, third information, fourth information, and fifth information, the second information indicating periodicity T to monitor a physical downlink control channel with cyclic redundancy check parity bits scrambled by the RNTI, the third information indicating subframes to monitor the physical downlink control channel in the periodicity T, the fourth information indicating a plurality of uplink-downlink configurations which are transmitted on the physical downlink control channel, and the fifth information indicating an index which is used to determine an uplink-downlink configuration for a serving cell from the plurality of uplink-downlink configurations indicated by the fourth information;

configuring the subframes to monitor the physical downlink control channel based on at least the third information; and monitoring the physical downlink control channel which includes at least the fourth information, in a common search space for a primary cell, in the configured subframes, in a case where the fifth information is configured for any of activated serving cells included in the plurality of cells, wherein in a case where the physical downlink control channel is detected in a radio frame, the uplink-downlink configuration for T/10 radio frames in the serving cell is given by the fourth information included in the physical downlink control channel for the serving cell, and the periodicity T is 20 milliseconds, 40 milliseconds, or 80 milliseconds.

4. The communication method according to claim 3, wherein the uplink-downlink configuration for the T/10 radio frames is used for monitoring the physical downlink control channel.

5. A base station apparatus that is configured to communicate with a user equipment by using a plurality of cells, comprising:

transmission circuitry configured to and/or programmed to transmit first information indicating a radio network temporary identifier (RNTI), second information, third information, fourth information, and fifth information, the second information indicating periodicity T to monitor a physical downlink control channel with cyclic redundant check parity bits scrambled by the RNTI, the third information indicating subframes to monitor the physical downlink control channel in the periodicity T, the fourth information indicating a plurality of uplink-downlink configurations which are transmitted on the physical downlink control channel, and the fifth information indicating an index which is used to determine an uplink-downlink configuration for a serving cell from the plurality of uplink-downlink configurations indicated by the fourth information, and control circuitry configured to and/or programmed to configure the subframes to transmit the physical downlink control channel based on at least the third information, wherein in a case where the fifth information is configured for any of activated serving cells included in the plurality of cells, the transmission circuitry is configured to and/or programmed to transmit the physical downlink control channel which includes at least the fourth information, in a common search space for a primary cell, in the configured subframes, in a case where the physical downlink control channel is transmitted in a radio frame, the uplink-downlink configuration for T/10 radio frames in the serving cell is given by the fourth information included in the physical downlink control channel for the serving cell, and the periodicity T is 20 milliseconds, 40 milliseconds, or 80 milliseconds.

6. The base station apparatus according to claim 5, wherein the uplink-downlink configuration for the T/10 radio frames is used to transmit the physical downlink control channel.

7. A communication method which is used in a base station apparatus that is configured to communicate with a user equipment by using a plurality of cells, the communication method comprising:

transmitting first information indicating a radio network temporary identifier (RNTI), second information, third information, fourth information, and fifth information, the second information indicating periodicity T to monitor a physical downlink control channel with cyclic redundancy check parity bits scrambled by the RNTI, the third information indicating subframes to monitor the physical downlink control channel in the periodicity T, the fourth information indicating a plurality of uplink-downlink configurations which are transmitted on the physical downlink control channel, and the fifth information indicating an index which is used to determine an uplink-downlink configuration for a serving cell from the plurality of uplink-downlink configurations indicated by the fourth information, configuring the subframes to transmit the physical downlink control channel based on at least the third information, and in a case where the transmitting the physical downlink control channel which includes at least the fourth information, in a common search space for a primary cell, in the configured subframes, in a case where the fifth information is configured for any of activated serving cells included in the plurality of cells, wherein in a case where the physical downlink control channel is transmitted in a radio frame, the uplink-downlink configuration for T/10 radio frames in the serving cell is given by the fourth information included in the physical downlink control channel for the serving cell, and the periodicity T is 20 milliseconds, 40 milliseconds, or 80 milliseconds.

8. The communication method according to claim 7, wherein
the uplink-downlink configuration for the T/10 radio frames is used to transmit the physical downlink control channel.

* * * * *